(12) United States Patent
Clyde et al.

(10) Patent No.: US 8,771,085 B1
(45) Date of Patent: Jul. 8, 2014

(54) MODULAR LAW ENFORCEMENT BATON

(76) Inventors: Arthur C. Clyde, Vero Beach, FL (US); Paul J. Lagassey, Vero Beach, FL (US)

(*) Notice: Subject to any disclaimer, the term of this patent is extended or adjusted under 35 U.S.C. 154(b) by 366 days.

(21) Appl. No.: 13/205,409

(22) Filed: Aug. 8, 2011

Related U.S. Application Data

(60) Provisional application No. 61/371,252, filed on Aug. 6, 2010.

(51) Int. Cl.
| | | |
|---|---|---|
| *H05K 5/00* | (2006.01) | |
| *H05K 7/00* | (2006.01) | |
| *G06F 1/16* | (2006.01) | |
| *A63B 15/00* | (2006.01) | |
| *A63B 59/00* | (2006.01) | |

(52) U.S. Cl.
USPC .... 463/47.4; 463/47.2; 463/47.6; 361/679.01

(58) Field of Classification Search
USPC ............ 361/679.01; 463/46, 47.2, 47.4, 47.6, 463/47.7
See application file for complete search history.

(56) References Cited

U.S. PATENT DOCUMENTS

| | | |
|---|---|---|
| 3,951,855 A | 4/1976 | Principe et al. |
| 4,047,893 A | 9/1977 | Kok et al. |
| 4,090,078 A | 5/1978 | Heim |
| 4,132,409 A | 1/1979 | Taylor |
| 4,161,875 A | 7/1979 | Stuitje |
| 4,278,636 A | 7/1981 | Voigt et al. |
| 4,294,583 A | 10/1981 | Leichnitz |
| 4,300,384 A | 11/1981 | Wiesner et al. |
| 4,317,453 A | 3/1982 | Heim et al. |
| 4,329,318 A | 5/1982 | Le Grouyellec et al. |
| 4,363,635 A | 12/1982 | Hutson |
| 4,391,777 A | 7/1983 | Hutson |
| 4,428,518 A | 1/1984 | Abel |
| 4,459,994 A | 7/1984 | Slemeyer |
| 4,487,055 A | 12/1984 | Wolf |
| 4,495,418 A | 1/1985 | Hutson |
| 4,522,398 A | 6/1985 | Swartz et al. |
| 4,564,021 A | 1/1986 | Siegmann et al. |
| D282,863 S | 3/1986 | Kashary, Jr. |
| 4,656,008 A | 4/1987 | Gump |
| 4,678,057 A | 7/1987 | Elfman et al. |
| 4,691,264 A | 9/1987 | Schaffhauser et al. |
| 4,693,403 A | 9/1987 | Sprouse |
| 4,703,932 A | 11/1987 | Kubota |
| 4,749,553 A | 6/1988 | Lopez et al. |
| 4,770,026 A | 9/1988 | Wolf |
| 4,809,810 A | 3/1989 | Elfman et al. |
| 4,837,558 A | 6/1989 | Abel et al. |

(Continued)

*Primary Examiner* — Anthony Haughton
(74) *Attorney, Agent, or Firm* — Steven M. Hoffberg; Ostrolenk Faber LLP

(57) ABSTRACT

A modular law enforcement baton having at least two useful functions disposed at a first end and a second end is described. The police baton comprises a unit comprising a handle and an elongated member connected to the handle. A first portion of the unit comprises a battery module and a battery for completing a first useful task. A second portion of the unit comprises a module for completing a second useful task. Useful tasks include but are not limited to providing light, providing pepper spray, optical scanning, measuring vehicular speed, measuring human blood alcohol levels, etc. The police baton may further comprises at least one of an accelerometer, a force gauge, and a strain gauge positioned within the unit and capable of measuring at least one of the acceleration, the force, and the strain to which a police baton is typically subject. The police baton may further comprise an automated processor, memory, persistent storage, a radio.

22 Claims, 23 Drawing Sheets

(56) References Cited

U.S. PATENT DOCUMENTS

| | | | |
|---|---|---|---|
| 4,868,545 | A | 9/1989 | Jones |
| 4,964,636 | A | 10/1990 | Ashihara |
| 4,982,645 | A | 1/1991 | Abboud |
| 4,996,161 | A | 2/1991 | Conners et al. |
| 5,081,568 | A | 1/1992 | Dong et al. |
| D325,297 | S | 4/1992 | Lipscomb et al. |
| 5,108,097 | A | 4/1992 | Ashihara |
| 5,108,098 | A | 4/1992 | Ashihara |
| 5,118,108 | A | 6/1992 | Wilmoth, III |
| 5,134,875 | A | 8/1992 | Jensen et al. |
| 5,171,535 | A | 12/1992 | Lamont |
| 5,180,164 | A | 1/1993 | Celaya |
| 5,188,362 | A | 2/1993 | Ashihara |
| 5,193,048 | A | 3/1993 | Kaufman et al. |
| 5,215,265 | A | 6/1993 | Lodovico |
| 5,282,332 | A | 2/1994 | Philips |
| 5,291,898 | A | 3/1994 | Wolf |
| 5,301,867 | A | 4/1994 | Bando |
| 5,320,349 | A | 6/1994 | Winston |
| 5,347,436 | A * | 9/1994 | Clyde et al. .......... 362/102 |
| D351,639 | S | 10/1994 | Su |
| 5,376,555 | A | 12/1994 | Forrester et al. |
| 5,386,992 | A | 2/1995 | Jaghab |
| 5,393,495 | A | 2/1995 | Forrester |
| 5,400,637 | A | 3/1995 | Forrester |
| 5,406,300 | A * | 4/1995 | Tokimoto et al. ......... 345/31 |
| 5,409,638 | A | 4/1995 | Battochi |
| D360,007 | S | 7/1995 | Farr |
| 5,447,308 | A | 9/1995 | Girard |
| 5,473,501 | A | 12/1995 | Claypool |
| 5,483,917 | A | 1/1996 | Walker |
| 5,494,283 | A | 2/1996 | Harris |
| 5,529,300 | A | 6/1996 | Frazier et al. |
| 5,571,395 | A | 11/1996 | Park et al. |
| 5,647,591 | A * | 7/1997 | Parsons .......... 463/47.4 |
| D386,299 | S | 11/1997 | Starrett |
| D386,612 | S | 11/1997 | Starrett |
| D389,420 | S | 1/1998 | Campman |
| D391,336 | S | 2/1998 | Cecilio |
| D395,069 | S | 6/1998 | Starrett |
| D401,374 | S | 11/1998 | Lum |
| D404,789 | S | 1/1999 | Starrett |
| 5,859,588 | A | 1/1999 | Malone et al. |
| 5,901,723 | A * | 5/1999 | Ames .......... 135/66 |
| 6,022,120 | A | 2/2000 | Chang |
| 6,096,558 | A | 8/2000 | Stock |
| 6,135,888 | A | 10/2000 | Hindi |
| 6,150,177 | A | 11/2000 | Stock |
| 6,177,051 | B1 | 1/2001 | Kimelman |
| D440,273 | S | 4/2001 | Hindi |
| 6,231,447 | B1 | 5/2001 | Pelkey |
| 6,238,292 | B1 | 5/2001 | Pelkey |
| 6,256,916 | B1 | 7/2001 | McNulty |
| 6,265,984 | B1 * | 7/2001 | Molinaroli .......... 340/815.4 |
| D450,144 | S | 11/2001 | Kim |
| D450,451 | S | 11/2001 | Starrett |
| D452,545 | S | 12/2001 | Starrett |
| 6,404,613 | B1 | 6/2002 | Dowling et al. |
| D462,918 | S | 9/2002 | Kim |
| 6,456,053 | B1 | 9/2002 | Rowley |
| 6,463,688 | B1 * | 10/2002 | Idehara .......... 42/1.16 |
| 6,464,941 | B1 | 10/2002 | Diekmann |
| 6,499,855 | B1 * | 12/2002 | Kukuk .......... 362/102 |
| 6,529,007 | B2 | 3/2003 | Ott et al. |
| 6,561,119 | B1 | 5/2003 | Rigitano |
| 6,583,625 | B1 | 6/2003 | Castle |
| 6,586,938 | B1 | 7/2003 | Paltoglou |
| 6,598,815 | B2 | 7/2003 | Hsieh |
| 6,615,622 | B2 * | 9/2003 | MacAleese et al. .......... 70/16 |
| 6,636,044 | B2 | 10/2003 | Candy |
| 6,636,412 | B2 | 10/2003 | Smith |
| 6,653,838 | B2 | 11/2003 | Candy |
| 6,686,742 | B2 | 2/2004 | Candy |
| 6,690,169 | B2 | 2/2004 | Candy |
| 6,696,947 | B1 | 2/2004 | Bybee |
| 6,792,793 | B2 | 9/2004 | Mendoza |
| 6,807,762 | B1 | 10/2004 | Edwards |
| 6,833,789 | B1 | 12/2004 | Carmen et al. |
| 6,911,823 | B2 | 6/2005 | Rowan |
| 6,923,040 | B2 | 8/2005 | Stock |
| 6,927,577 | B2 | 8/2005 | Nelson |
| 6,957,750 | B1 | 10/2005 | Trudell |
| 6,961,093 | B2 | 11/2005 | Higuchi |
| 6,967,581 | B2 | 11/2005 | Karsten |
| 7,013,083 | B2 | 3/2006 | Yamane |
| 7,049,760 | B2 | 5/2006 | Dowe |
| 7,061,236 | B2 | 6/2006 | Britton |
| 7,064,788 | B2 | 6/2006 | Yoshida et al. |
| 7,071,986 | B2 | 7/2006 | Kobayashi et al. |
| 7,071,989 | B2 | 7/2006 | Nakata |
| 7,075,578 | B1 | 7/2006 | Kubo |
| 7,078,906 | B2 | 7/2006 | Nelson |
| 7,088,103 | B2 | 8/2006 | Kelley |
| 7,090,196 | B1 | 8/2006 | Linker |
| 7,106,378 | B2 | 9/2006 | Kawakami |
| 7,106,962 | B2 | 9/2006 | Hills et al. |
| D530,774 | S | 10/2006 | Oscarsson et al. |
| 7,122,154 | B1 | 10/2006 | Forrester et al. |
| 7,129,983 | B2 | 10/2006 | Rantanen et al. |
| 7,130,535 | B2 | 10/2006 | Takeuchi |
| 7,136,672 | B2 | 11/2006 | Kitano et al. |
| 7,145,328 | B2 | 12/2006 | Manneschi |
| 7,145,456 | B2 | 12/2006 | Castle |
| 7,148,691 | B2 | 12/2006 | Nelson et al. |
| 7,148,922 | B2 | 12/2006 | Shimada |
| 7,171,842 | B2 | 2/2007 | Stock et al. |
| 7,176,691 | B2 | 2/2007 | Nelson |
| 7,178,999 | B2 | 2/2007 | Stiehler |
| 7,193,524 | B2 | 3/2007 | Castle et al. |
| 7,208,881 | B2 | 4/2007 | Young |
| 7,224,894 | B2 | 5/2007 | Kawakami |
| 7,227,466 | B2 | 6/2007 | Nelson |
| 7,236,697 | B2 | 6/2007 | Kim et al. |
| 7,261,456 | B2 | 8/2007 | Liu |
| 7,265,551 | B2 | 9/2007 | Kellermann |
| D552,207 | S | 10/2007 | Rhee |
| 7,296,683 | B1 | 11/2007 | Vallelonga, Sr. et al. |
| 7,310,586 | B2 | 12/2007 | Stamatescu et al. |
| 7,316,621 | B2 | 1/2008 | Tufts |
| D561,294 | S | 2/2008 | Pennington |
| 7,329,390 | B2 | 2/2008 | Stock et al. |
| 7,333,144 | B2 | 2/2008 | Kubo |
| 7,372,499 | B2 | 5/2008 | Kawakami |
| 7,373,081 | B2 | 5/2008 | Toya |
| 7,379,117 | B2 | 5/2008 | Hwang |
| 7,385,642 | B2 | 6/2008 | Yamamoto et al. |
| 7,406,258 | B2 | 7/2008 | Yamada |
| 7,411,712 | B2 | 8/2008 | Nakajima et al. |
| 7,412,161 | B2 | 8/2008 | Yamada |
| 7,418,201 | B2 | 8/2008 | Uemura |
| D576,246 | S | 9/2008 | Pennington |
| 7,421,933 | B1 | 9/2008 | Pearson |
| 7,422,723 | B1 | 9/2008 | Betsill |
| 7,423,422 | B2 | 9/2008 | Kubotera et al. |
| 7,423,786 | B2 | 9/2008 | Khovaylo |
| 7,424,216 | B2 | 9/2008 | Liem |
| 7,428,016 | B2 | 9/2008 | Takenaka |
| 7,434,517 | B1 | 10/2008 | Linker |
| 7,436,567 | B2 | 10/2008 | Ueyama |
| 7,437,063 | B2 | 10/2008 | Clark |
| 7,441,905 | B2 | 10/2008 | Tseng et al. |
| 7,443,141 | B2 | 10/2008 | Ichimasa |
| 7,445,723 | B2 | 11/2008 | Lee et al. |
| 7,450,168 | B1 | 11/2008 | Lee et al. |
| 7,453,616 | B2 | 11/2008 | Shimomura |
| 7,463,394 | B2 | 12/2008 | Shechterman |
| 7,463,825 | B2 | 12/2008 | Helbing et al. |
| 7,470,070 | B2 | 12/2008 | Kojima |
| D585,519 | S | 1/2009 | Pennington |
| 7,472,532 | B2 | 1/2009 | Desnijder et al. |
| 7,474,102 | B2 | 1/2009 | Candy |
| 7,479,626 | B2 | 1/2009 | Karasawa et al. |
| 7,483,183 | B2 | 1/2009 | Luster |
| 7,499,070 | B2 | 3/2009 | Horie et al. |

(56) References Cited

U.S. PATENT DOCUMENTS

| | | |
|---|---|---|
| 7,499,636 B2 | 3/2009 | Feng et al. |
| 7,505,682 B2 | 3/2009 | Liu |
| 7,515,170 B2 | 4/2009 | Omori et al. |
| 7,515,323 B2 | 4/2009 | Mizoguchi |
| 7,520,248 B1 | 4/2009 | Linker |
| 7,522,831 B2 | 4/2009 | Feng et al. |
| 7,525,561 B2 | 4/2009 | Nakajima et al. |
| 7,525,710 B2 | 4/2009 | Atsuumi et al. |
| 7,528,958 B2 | 5/2009 | Hughes et al. |
| 7,532,227 B2 | 5/2009 | Nakajima et al. |
| 7,535,594 B2 | 5/2009 | Yoshizawa et al. |
| 7,535,612 B2 | 5/2009 | Shoji |
| 7,538,924 B2 | 5/2009 | Tomita |
| 7,538,925 B2 | 5/2009 | Miyatake |
| 7,541,192 B2 | 6/2009 | Stock |
| 7,548,271 B2 | 6/2009 | Yuyama |
| 7,552,874 B2 | 6/2009 | Detwiler et al. |
| 7,570,406 B2 | 8/2009 | Mizoguchi et al. |
| 7,570,881 B2 | 8/2009 | Perala et al. |
| 7,573,626 B2 | 8/2009 | Urakawa |
| 7,575,065 B1 | 8/2009 | Podhrasky |
| 7,579,839 B2 | 8/2009 | Candy |
| 7,588,187 B2 | 9/2009 | Barkan et al. |
| 7,589,785 B2 | 9/2009 | Kobayashi |
| 7,592,907 B2 | 9/2009 | Manneschi et al. |
| 7,593,028 B2 | 9/2009 | Kimura |
| 7,593,150 B2 | 9/2009 | Masuda |
| 7,601,949 B2 | 10/2009 | Karasawa et al. |
| 7,602,540 B2 | 10/2009 | Masuda et al. |
| 7,602,680 B2 | 10/2009 | Fechner |
| 7,603,886 B2 | 10/2009 | Stock |
| 7,603,887 B2 | 10/2009 | Schlichte |
| 7,611,055 B1 | 11/2009 | Detwiler |
| 7,615,971 B2 | 11/2009 | Ichimasa |
| 7,616,364 B2 | 11/2009 | Saisho et al. |
| 7,634,192 B2 | 12/2009 | Chang et al. |
| 7,639,407 B2 | 12/2009 | Clarke et al. |
| 7,639,413 B2 | 12/2009 | Nishikawa et al. |
| 7,643,135 B1 | 1/2010 | Walsh |
| 7,643,191 B2 | 1/2010 | Okuwaki et al. |
| 7,646,519 B2 | 1/2010 | Shiraishi |
| 7,649,356 B2 | 1/2010 | Earle |
| 7,652,477 B2 | 1/2010 | Candy |
| 7,656,153 B2 | 2/2010 | Westersten |
| D611,114 S | 3/2010 | Pennington |
| D611,115 S | 3/2010 | Pennington |
| D611,116 S | 3/2010 | Pennington |
| 7,672,032 B2 | 3/2010 | Hayashi et al. |
| 7,679,045 B2 | 3/2010 | Steinert |
| 7,679,802 B2 | 3/2010 | Shimomura |
| 7,681,798 B2 | 3/2010 | Kojima |
| 7,683,966 B2 | 3/2010 | Kawakami |
| 7,683,967 B2 | 3/2010 | Kawakami |
| 7,688,490 B2 | 3/2010 | Mizoguchi |
| 7,688,491 B2 | 3/2010 | Saisho et al. |
| 7,697,180 B2 | 4/2010 | Nakajima |
| 7,697,181 B2 | 4/2010 | Mizoguchi |
| 7,697,185 B2 | 4/2010 | Yoda |
| 7,701,204 B2 | 4/2010 | Westersten |
| 7,701,337 B2 | 4/2010 | Westersten |
| 7,702,228 B2 | 4/2010 | Clark |
| 7,702,235 B2 | 4/2010 | Drader et al. |
| RE41,338 E | 5/2010 | Huang |
| 7,710,118 B2 | 5/2010 | Emery |
| 7,710,457 B2 | 5/2010 | Schnell |
| 7,717,521 B2 | 5/2010 | Hall et al. |
| 7,727,622 B2 | 6/2010 | Shim et al. |
| 7,728,989 B2 | 6/2010 | Doherty et al. |
| 7,733,551 B2 | 6/2010 | Murata et al. |
| 7,734,168 B2 | 6/2010 | Kawakami |
| 7,738,725 B2 | 6/2010 | Raskar et al. |
| 7,742,098 B2 | 6/2010 | Kawakami |
| 7,746,622 B2 | 6/2010 | Young |
| 7,747,161 B2 | 6/2010 | Yao et al. |
| 2005/0187025 A1 | 8/2005 | Shaw et al. |
| 2006/0055818 A1 | 3/2006 | Hwang |
| 2006/0072916 A1 | 4/2006 | Liu |
| 2006/0088306 A1 | 4/2006 | Hills et al. |
| 2006/0093344 A1 | 5/2006 | Neel |
| 2006/0093350 A1 | 5/2006 | Stiehler |
| 2006/0159441 A1 | 7/2006 | Feng et al. |
| 2006/0165399 A1 | 7/2006 | Feng et al. |
| 2006/0245750 A1 | 11/2006 | Liem |
| 2006/0250519 A1 | 11/2006 | Kawakami |
| 2007/0030340 A1 | 2/2007 | Kitano et al. |
| 2007/0081811 A1 | 4/2007 | Helbing et al. |
| 2007/0139550 A1 | 6/2007 | Takematsu |
| 2007/0196095 A1 | 8/2007 | Perala et al. |
| 2007/0237510 A1 | 10/2007 | Clark |
| 2007/0238533 A1 | 10/2007 | Tufts |
| 2007/0248347 A1 | 10/2007 | Chang et al. |
| 2008/0062302 A1 | 3/2008 | Kawakami |
| 2008/0074536 A1 | 3/2008 | Tamura |
| 2008/0074551 A1 | 3/2008 | Kawakami |
| 2008/0088733 A1 | 4/2008 | Tamura |
| 2008/0136960 A1 | 6/2008 | Kawakami |
| 2008/0166112 A1 | 7/2008 | Takematsu |
| 2008/0181596 A1 | 7/2008 | Drader et al. |
| 2008/0181598 A1 | 7/2008 | Kobre |
| 2008/0211461 A1 | 9/2008 | Ichimasa |
| 2008/0260371 A1 | 10/2008 | Hughes |
| 2008/0298798 A1 | 12/2008 | Lin |
| 2009/0034952 A1 | 2/2009 | Clark |
| 2009/0103912 A1 | 4/2009 | Yao et al. |
| 2009/0121644 A1 | 5/2009 | Sandner et al. |
| 2009/0129765 A1 | 5/2009 | King |
| 2009/0135262 A1 | 5/2009 | Ogasawara |
| 2009/0153729 A1 | 6/2009 | Hiltunen et al. |
| 2009/0160944 A1 | 6/2009 | Trevelyan et al. |
| 2009/0190002 A1 | 7/2009 | Tamura |
| 2009/0196595 A1 | 8/2009 | Okubo |
| 2009/0208198 A1 | 8/2009 | Khuntia |
| 2009/0243493 A1 | 10/2009 | Bergquist |
| 2009/0263117 A1 | 10/2009 | Brosnan |
| 2009/0279881 A1 | 11/2009 | Geris et al. |
| 2009/0284647 A1 | 11/2009 | Yanai et al. |
| 2009/0285573 A1 | 11/2009 | Aoyagi |
| 2009/0310013 A1 | 12/2009 | Odaka |
| 2010/0008658 A1 | 1/2010 | King |
| 2010/0020227 A1 | 1/2010 | Robinson et al. |
| 2010/0074610 A1 | 3/2010 | Trevelyan |
| 2010/0079581 A1 | 4/2010 | Russell et al. |
| 2010/0109613 A1 | 5/2010 | Chuang et al. |
| 2010/0118177 A1 | 5/2010 | Niblock |
| 2010/0124412 A1 | 5/2010 | King |
| 2010/0134679 A1 | 6/2010 | Lin |

\* cited by examiner

MODULAR LAW ENFORCEMENT BATON

CROSS REFERENCE TO RELATED APPLICATIONS

The present application is a non-provisional of U.S. Provisional Patent Application No. 61/371,252, filed Aug. 6, 2010, the entirety of which is expressly incorporated herein by reference.

FIELD OF THE INVENTION

The present invention relates to the field of baton weapons, and more particularly to baton having ancillary features.

BACKGROUND OF THE INVENTION

A side-handle baton (sometimes referred to as T-batons or Nightsticks) is a baton with a short side handle at a right angle to the shaft, about six inches from one end. The main shaft is typically 24 inches (61 cm) in length. A well known example is the Monadnock PR-24. It can be held by: One end, and the corner between the shaft and the handle used to catch a long swung blunt or sharp weapon; or the side handle, and the long shaft held against the hand and forearm to splint and shield the arm against an expected blow from an attacker. Side-handle batons are made in both fixed and collapsible models, and may be constructed from a range of materials including wood, polycarbonate, epoxy, and aluminum. Some side-handle batons are one-piece in design; the side-handle component and primary shaft are permanently fused together during manufacturing. One-piece designs are potentially stronger in design than two-piece designs, and have no risk of having a locking screw loosen from its threads. Other side-handle batons are two-piece in design; the side-handle component is screwed into primary shaft. The side handle may be removed from the shaft by the end-user, converting the side-handle into a straight baton. Users of two-piece side handle batons are advised to apply a thread-locking compound to the side-handle screw to prevent loosening under use.

The advantages of a side-handle baton over a straight baton are numerous: There are a far greater number of defensive techniques/maneuvers that may be used with the side-handle baton in contrast with the straight baton; the side-handle component may aid in weapon retention, making it more difficult for a suspect to take the baton away from the officer in a struggle; The side-handle component prevents the baton from rolling far away if inadvertently dropped, unlike a straight baton; subjectively, some officers may be able to deliver a strike of greater power with the side-handle baton (when used in conjunction with a "power stroke") over a straight baton; Due to its design, a side handle baton is generally used in a more defensive and less offensive manner than a straight baton, and thus it is less likely for an officer to "instinctively" use a side-handle baton as a simple bludgeon and direct indiscriminate strikes against a suspect. Also, the typically defensive stance the side-handle baton is used with is generally believed to present a more community-friendly image than a straight baton. Side-handle batons have a few disadvantages: More training is required for an officer to fully utilize the potential of a side-handle baton compared to a straight baton; the side-handle slightly increases overall weight and bulk of the baton compared to a straight baton of identical length; when the side-handle baton is used as a simple bludgeon (without gripping the side-handle), it is less effective than a straight baton. See, en.wikipedia.org/wiki/Baton_(law_enforcement), last accessed Aug. 5, 2010, expressly incorporated herein by reference.

Police batons, some of which feature side handles (also known as cross handles), are typically carried by law enforcement officers, security guards, and the military. These devices are also known as nightsticks. These are used as non-lethal weapons and safety devices. Police batons are described in detail in several US patent applications and issued US patents. See U.S. Pat. No. 5,108,097, US App. 2007/0238533, US App. 2005/0187025, U.S. Pat. No. 7,316,621, U.S. Pat. No. 6,615,622, U.S. Pat. No. 6,499,855, U.S. D452,545, U.S. D450,451, U.S. Pat. No. 6,238,292, U.S. Pat. No. 6,231,447, U.S. D440,273, U.S. Pat. No. 6,135,888, U.S. D404,789, U.S. D401,374, U.S. D395,069, U.S. D391,336, U.S. D386,612, U.S. D386,299, U.S. Pat. No. 5,529,300, U.S. Pat. No. 5,494,283, U.S. Pat. No. 5,447,308, U.S. D360,007, U.S. Pat. No. 5,386,992, U.S. Pat. No. 5,320,349, U.S. Pat. No. 5,188,362, U.S. Pat. No. 5,180,164, U.S. Pat. No. 5,118,108, U.S. Pat. No. 5,108,098, U.S. Pat. No. 5,108,097, U.S. Pat. No. 5,081,568, U.S. Pat. No. 4,964,636, U.S. Pat. No. 4,703,932, U.S. D282,863, U.S. Pat. No. 4,522,398, and U.S. Pat. No. 4,132,409, each of which is expressly incorporated herein by reference.

U.S. Pat. No. 5,347,436, Clyde, et al., expressly incorporated herein by reference in its entirety, provides a combination baton/light emitting device having a stick portion and a handle orthogonal thereto. The stick portion includes a hollow cylindrical chamber having a flashlight mechanism at one end thereof. The flashlight mechanism comprises a longitudinally slit metallic cylindrical member spring-biased to widen the diameter thereof and the slit and fitably engaged with the inner chamber wall. Electrical contacts, first and second electrical contact members, a switch and a flashlight bulb are provided for energization. The handle has an axis transverse to the longitudinal axis of the stick portion and housing the switch. The handle portion has a housing for maintaining the location of the switch for operation with the same hand of the individual holding the combined flashlight-baton. Internal contacts and electrical connections are provided in the hollowed-out cylindrical chamber and the handle, the cylindrical member being part of the electric circuitry for the light mechanism.

The police baton with crosshandle, described in detail in U.S. Pat. No. 5,108,097, incorporated herein by reference, has a baton main body and a crosshandle branched in perpendicular from the baton main body at a position localized longitudinally from the center to one end of the baton main body. A user of the police baton usually grips the crosshandle with his little finger positioned on the side near the baton main body and manipulates the baton while controlling the gripping force. The user performs offense and defense to strike an opponent, for example, by rotating the baton around the axis of the crosshandle while thrusting the baton main body, suddenly stopping the rotation or projecting the baton main body along its axial direction.

One example of a police baton with crosshandle has a baton main body with crosshandle and a telescopic structure comprising a plurality of hollow cylindrical members each of different diameter. If the baton main body is contracted, it can be put into a holder and suspended from a waist or shoulder of a user like that a hand gun and can be carried about without being observed and giving no threatening impression if he puts on a suit or a jacket over it.

One conventional structure for attaching or detaching an attachment to and from a police baton is a structure in which a guard is secured as an attachment to a simply straight rod-like police baton. In this structure, a guard made of a metal thin plate is detachably mounted to a police baton having a gripping haft at one end of a rod member which is made telescopic in the longitudinal direction. The guard is made of a metal thin plate, which is mounted detachably to the police baton. The combination forms an opening in a central portion of a metal tongue plate. The result is a circumferential groove substantially at one-half thickness along the outer circumferential side of a rubber ring. This groove has an inner diameter equal with an outer diameter of the police baton rod member in the vicinity of the base end thereof. It further has an appropriate thickness. The combination fits the outer circumferential groove to the opening in the metal plate to constitute a guard and fitting the rubber ring around the circumferential periphery of the rod member from the end. It passes as far as the base end of the gripping haft.

The simple straight police baton described above is easy in the way of use and suitable to general use but it involves a drawback that a hand gripping the haft is exposed to the outside tending to be injured by opponent's weapon or the like.

On the other hand, in the police baton with crosshandle, when it is used like that a straight police baton by gripping the haft of the main body, the crosshandle serves as a guard to protect the gripping hand. On the other hand, when it is used by gripping the cross handle, quick motion, high speed rotation, sudden starting or stopping, or jabbing from out of the opponent's view which is difficult to be forecast and, accordingly, it is considered more effective than the simply straight baton. However, it requires a considerable period of time for training to get skilled in the manipulation for controlling the movement of a rod main body by adjusting the gripping force to the cross handle. In addition, there has been a problem that a crosshandle protruding in perpendicular to the baton main body is in the way when it is intended to carry about the police baton without being observed, for example, in a state where a policeman disguises himself into light wears without a suit or jacket or in a case where it is contained in a more compact state, upon secret investigation.

Strobe lights and LED strobe lights are flashlights that shine a bright light. When a strobe light is shined into the face of a suspect, the suspect may have difficulty seeing for a short time, with little or no long term damage. This will allow the police officer to detain, disarm, and arrest the suspect with little danger to both the suspect and the police officer. Various forms of strobe lights are described in detail in Wikipedia: Strobe Light, en.wikipedia.org/wiki/Strobe_light, last visited Jun. 24, 2010. See also U.S. Pat. No. 7,208,881, incorporated herein by reference.

Flashes, which cause momentary bright or extremely bright light are known in the art. These are useful in photography to temporarily light up a scene so that a camera can take a picture. Many cameras manufactured by Kodak, Canon, Polaroid, and others, and sold at Staples, BestBuy, and other retailers, feature flash technology. In addition, flash technology is described in detail in U.S. Pat. No. 7,747,161, U.S. Pat. No. 7,742,098, U.S. Pat. No. 7,738,725, U.S. Pat. No. 7,734, 168, U.S. Pat. No. 7,710,457, U.S. Pat. No. 7,702,235, U.S. Pat. No. 7,702,228, U.S. Pat. No. 7,683,967, U.S. Pat. No. 7,683,966, U.S. Pat. No. 7,634,192, U.S. Pat. No. 7,615,971, U.S. Pat. No. 7,589,785, U.S. Pat. No. 7,570,881, U.S. Pat. No. 7,548,271, U.S. Pat. No. 7,522,831, U.S. Pat. No. 7,505, 682, U.S. Pat. No. 7,499,636, U.S. Pat. No. 7,463,825, U.S. Pat. No. 7,450,168, U.S. Pat. No. 7,443,141, U.S. Pat. No. 7,437,063, U.S. Pat. No. 7,428,016, U.S. Pat. No. 7,424,216, U.S. Pat. No. 7,418,201, U.S. Pat. No. 7,412,161, U.S. Pat. No. 7,406,258, U.S. Pat. No. 7,385,642, U.S. Pat. No. 7,379, 117, U.S. Pat. No. 7,373,081, U.S. Pat. No. 7,372,499, U.S. Pat. No. 7,333,144, U.S. Pat. No. 7,236,697, U.S. Pat. No. 7,224,894, U.S. Pat. No. 7,178,999, U.S. Pat. No. 7,148,922, U.S. Pat. No. 7,136,672, U.S. Pat. No. 7,130,535, U.S. Pat. No. 7,129,983, U.S. Pat. No. 7,106,962, U.S. Pat. No. 7,106, 378, U.S. Pat. No. 7,075,578, U.S. Pat. No. 7,071,989, U.S. Pat. No. 7,071,986, U.S. Pat. No. 7,064,788, U.S. Pat. No. 7,049,760, U.S. Pat. No. 7,013,083, U.S. Pat. No. 6,961,093, US App. 2010/0134679, US App. 2010/0124412, US App. 2010/0118177, US App. 2010/0109613, US App. 2010/ 0079581, US App. 2010/0074610, US App. 2010/0020227, US App. 2010/0008658, US App. 2009/0310013, US App. 2009/0285573, US App. 2009/0284647, US App. 2009/ 0279881, US App. 2009/0263117, US App. 2009/0243493, US App. 2009/0208198, US App. 2009/0196595, US App. 2009/0190002, US App. 2009/0160944, US App. 2009/ 0153729, US App. 2009/0135262, US App. 2009/0129765, US App. 2009/0121644, US App. 2009/0103912, US App. 2009/0034952, US App. 2008/0298798, US App. 2008/ 0260371, US App. 2008/0211461, US App. 2008/0181598, US App. 2008/0181596, US App. 2008/0166112, US App. 2008/0136960, US App. 2008/0088733, US App. 2008/ 0074551, US App. 2008/0074536, US App. 2008/0062302, US App. 2007/0248347, US App. 2007/0237510, US App. 2007/0196095, US App. 2007/0139550, US App. 2007/ 0081811, US App. 2007/0030340, US App. 2006/0250519, US App. 2006/0245750, US App. 2006/0165399, US App. 2006/0159441, US App. 2006/0093350, US App. 2006/ 0093344, US App. 2006/0088306, US App. 2006/0072916, and US App. 2006/0055818, each of which is expressly incorporated herein by reference in its entirety.

Optical scanners are known in the art. These scanners can read a bar code, and provide information related to the bar code. For example, a bar code on a driver's license can be scanned. When the scanner is connected, either over wires or wirelessly, to a computer with a display, the computer can provide information relevant to the driver's license. For example, the computer can allow the officer to enter the information about a traffic ticket that he is about to issue or to verify the validity of the driver's license, vehicle registration, and insurance. Various systems and methods for making and using optical scanners are described in: U.S. Pat. No. 7,733, 551, U.S. Pat. No. 7,728,989, U.S. Pat. No. 7,727,622, U.S. RE41,338, U.S. Pat. No. 7,697,185, U.S. Pat. No. 7,697,181, U.S. Pat. No. 7,697,180, U.S. Pat. No. 7,688,491, U.S. Pat. No. 7,688,490, U.S. Pat. No. 7,681,798, U.S. Pat. No. 7,679, 802, U.S. Pat. No. 7,679,045, U.S. Pat. No. 7,672,032, U.S. Pat. No. 7,646,519, U.S. Pat. No. 7,643,191, U.S. Pat. No. 7,643,135, U.S. Pat. No. 7,639,413, U.S. Pat. No. 7,639,407, U.S. Pat. No. 7,616,364, U.S. Pat. No. 7,611,055, U.S. Pat. No. 7,602,680, U.S. Pat. No. 7,602,540, U.S. Pat. No. 7,601, 949, U.S. Pat. No. 7,593,150, U.S. Pat. No. 7,593,028, U.S. Pat. No. 7,588,187, U.S. Pat. No. 7,573,626, U.S. Pat. No. 7,570,406, U.S. Pat. No. 7,552,874, U.S. Pat. No. 7,538,925, U.S. Pat. No. 7,538,924, U.S. Pat. No. 7,535,612, U.S. Pat. No. 7,535,594, U.S. Pat. No. 7,532,227, U.S. Pat. No. 7,528, 958, U.S. Pat. No. 7,525,710, U.S. Pat. No. 7,525,561, U.S. Pat. No. 7,515,323, U.S. Pat. No. 7,515,170, U.S. Pat. No. 7,499,070, U.S. Pat. No. 7,483,183, U.S. Pat. No. 7,479,626, U.S. Pat. No. 7,470,070, U.S. Pat. No. 7,463,394, U.S. Pat. No. 7,453,616, U.S. Pat. No. 7,445,723, U.S. Pat. No. 7,441, 905, U.S. Pat. No. 7,436,567, U.S. Pat. No. 7,423,786, and U.S. Pat. No. 7,411,712, the disclosure of each of which is expressly incorporated by reference herein in its entirety.

Breath alcohol detectors are typically used by police officers in investigating driving under influence (DUI) and other alcohol-related violations. A breathalyzer is a device for estimating blood alcohol content (BAC) from a breath sample.

This device is described in detail in Wikipedia: Breathalyzer, en.wikipedia.org/wiki/Breathalyzer, last accessed Jun. 25, 2010. Systems and methods for detecting blood alcohol content from a person's breath are described in detail in: U.S. Pat. No. 7,603,887, U.S. Pat. No. 7,603,886, U.S. Pat. No. 7,541,192, U.S. Pat. No. 7,422,723, U.S. Pat. No. 7,329,390, U.S. Pat. No. 7,171,842, U.S. Pat. No. 7,122,154, U.S. Pat. No. 6,967,581, U.S. Pat. No. 6,923,040, U.S. Pat. No. 6,792,793, U.S. Pat. No. 6,464,941, U.S. Pat. No. 6,177,051, U.S. Pat. No. 6,150,177, U.S. Pat. No. 6,096,558, U.S. Pat. No. 5,571,395, U.S. Pat. No. 5,400,637, U.S. Pat. No. 5,393,495, U.S. Pat. No. 5,376,555, U.S. Pat. No. 5,291,898, U.S. Pat. No. 5,171,535, U.S. Pat. No. 5,134,875, U.S. Pat. No. 4,996,161, U.S. Pat. No. 4,868,545, U.S. Pat. No. 4,809,810, U.S. Pat. No. 4,770,026, U.S. Pat. No. 4,749,553, U.S. Pat. No. 4,678,057, U.S. Pat. No. 4,656,008, U.S. Pat. No. 4,564,021, U.S. Pat. No. 4,495,418, U.S. Pat. No. 4,487,055, U.S. Pat. No. 4,459,994, U.S. Pat. No. 4,391,777, U.S. Pat. No. 4,363,635, U.S. Pat. No. 4,329,318, U.S. Pat. No. 4,317,453, U.S. Pat. No. 4,300,384, U.S. Pat. No. 4,294,583, U.S. Pat. No. 4,278,636, U.S. Pat. No. 4,161,875, U.S. Pat. No. 4,090,078, U.S. Pat. No. 4,047,893, and U.S. Pat. No. 3,951,855, the disclosure of each of which is expressly incorporated by reference herein in its entirety.

Pepper spray, also known as OC spray (from "Oleoresin Capsicum"), OC gas, and capsicum spray, is a lachrymatory agent (a chemical compound that irritates the eyes to cause tears, pain, and even temporary blindness) that is used in riot control, crowd control, and personal self-defense. Pepper spray is useful to the police because it can be used to immobilize individual suspects or crowds while placing both the police officer and the suspects or crowds in relatively little long term danger. Pepper spray is described in detail in Wikipedia: Pepper Spray, en.wikipedia.org/wiki/Pepper_spray, last accessed Jun. 25, 2010. Various systems and methods for making, using, and storing pepper spray are described in detail in: U.S. Pat. No. 6,957,750, U.S. Pat. No. 5,901,723, and U.S. Pat. No. 5,859,588, each of which is expressly incorporated herein by reference.

Means for connecting substantially arbitrary devices to a computer are known in the art. USB ports (e.g., USB 1.1, 2.0, 3.0) and Bluetooth® (v2, v3) wireless technology are typically used for this purpose. In a USB connection, one end of a wire is adapted to be plugged into a laptop or desktop USB port, and the other end is adapted to be plugged into an input for the device to connect to the computer, such as a cell phone, digital music player, global positioning system (GPS) device, etc. The external device may then exchange data and communicate with the computer. Optionally, a device that is plugged into a USB port of a laptop or desktop computer may be configured to communicate wirelessly with another device. This is typically used for wireless computer mice, which are manufactured by Microsoft Corporation, Hewlett Packard Corporation, and others. Bluetooth® technology allows for wireless communication between two devices that are configured for such communication, typically used in cell phones, digital music players, hands free headsets for cell phones and music players, and laptop computers.

Metal detectors are known in the art. These are used to locate objects made of metal, such as coins, weapons, bombs, or electronic devices. See: U.S. Pat. No. 7,717,521, U.S. Pat. No. 7,710,118, U.S. Pat. No. 7,701,337, U.S. Pat. No. 7,701,204, U.S. Pat. No. 7,656,153, U.S. Pat. No. 7,652,477, U.S. Pat. No. 7,649,356, U.S. Pat. No. 7,592,907, U.S. Pat. No. 7,579,839, U.S. Pat. No. 7,575,065, U.S. Pat. No. 7,474,102, U.S. Pat. No. 7,472,532, U.S. Pat. No. 7,423,422, U.S. Pat. No. 7,310,586, U.S. Pat. No. 7,296,683, U.S. Pat. No. 7,265,551, U.S. Pat. No. 7,227,466, U.S. Pat. No. 7,193,524, U.S. Pat. No. 7,176,691, U.S. Pat. No. 7,148,691, U.S. Pat. No. 7,145,456, U.S. Pat. No. 7,145,328, U.S. Pat. No. 7,088,103, U.S. Pat. No. 7,078,906, U.S. Pat. No. 7,061,236, U.S. Pat. No. 6,927,577, U.S. Pat. No. 6,911,823, U.S. Pat. No. 6,833,789, U.S. Pat. No. 6,696,947, U.S. Pat. No. 6,690,169, U.S. Pat. No. 6,686,742, U.S. Pat. No. 6,653,838, U.S. Pat. No. 6,636,044, U.S. Pat. No. 6,586,938, U.S. Pat. No. 6,583,625, U.S. Pat. No. 6,529,007, and U.S. Pat. No. 6,456,053, each of which is expressly incorporated herein by reference.

Glass breaking modules are known in the art. See: U.S. Pat. No. 6,598,815, U.S. Pat. No. 5,301,867, U.S. Pat. No. 5,215,265, U.S. Pat. No. 4,837,558, U.S. Pat. No. 4,693,403, and U.S. Pat. No. 4,428,518, each of which is expressly incorporated herein by reference.

Traffic directing wands are known in the art. See: U.S. Pat. No. 7,261,456, U.S. Pat. No. 6,561,119, U.S. D462,918, U.S. D450,144, U.S. D389,420, and U.S. Pat. No. 5,483,917, each of which is expressly incorporated herein by reference.

Stun guns, incapacitant weapons that momentarily disable a victim with an electric shock, are known in the art. See: U.S. Pat. No. 7,746,622, U.S. D611,116, U.S. D611,115, U.S. D611,114, U.S. Pat. No. 7,520,248, U.S. D585,519, U.S. Pat. No. 7,434,517, U.S. Pat. No. 7,421,933, U.S. D576,246, U.S. D561,294, U.S. D552,207, U.S. D530,774, U.S. Pat. No. 7,090,196, U.S. Pat. No. 6,807,762, U.S. Pat. No. 6,636,412, U.S. Pat. No. 6,404,613, U.S. Pat. No. 6,256,916, U.S. Pat. No. 6,022,120, U.S. Pat. No. 5,473,501, U.S. Pat. No. 5,409,638, U.S. D351,639, U.S. Pat. No. 5,282,332, U.S. Pat. No. 5,193,048, U.S. D325,297, U.S. Pat. No. 4,982,645, and U.S. Pat. No. 4,691,264, each of which is expressly incorporated herein by reference.

FIG. 4 illustrates a prior art police baton 400. This police baton has a handle 410, which connects at one end to an elongated member 440. The elongated member 440 has two ends 420 and 430. The police officer is intended to hold the baton in his hand using handle 420 and to use the baton for non-lethal self-defense. Batons are made of wood, metal, plastic, or similar materials.

Certain customized police batons are known in the art. For example, a police baton with an LED flashlight is sold by assistedknife.com. See LED Flashlight Tactical Police Baton Telescoping 16 inch Expandable Club, www.assistedknife.com/index.cfm/fa/items.main/parentcat/25009/subcatid/67732/id/451415, last accessed Jun. 25, 2010.

Folding batons are also known in the art. These are sold on the Internet by Self Defense Outlet at Self Defense Outlet: Folding Steel Collapsible Batons, www.self-defense-outlet.com/Store/folding_steel_batons, last visited Jun. 25, 2010.

SUMMARY OF THE INVENTION

As law enforcement becomes more complex, law enforcement, security, military and criminal justice officers are being required to carry more and more equipment. The present invention seeks to address this problem by providing a baton with a modular design which is able to accommodate at least two functions in one package, and to enable an officer in the field to replace at least one module with at least one other module. In its simplest form, the invention combines a baton and flashlight into a single unit. More advanced embodiments provide a system and method of modules with various accessories and modern functionality such as the ability to control functions, store data and communicate with other devices.

It is an object of the invention to provide a law enforcement baton comprising: a baton housing, a detachable perpendicular side handle connected to said baton hosing by at least one screw; a battery housing disposed in the first end of said baton housing, said battery housing having a removable module for performing at least one first useful task; the second end of said baton housing having a removable module for performing at least one second useful task. The modules at either end can be removed and replaced with other modules, each such module being for performing at least one other useful task.

Lighted batons of the prior art were prone to breaking if the impact forces of a strike were too high, particularly in the vicinity of where the baton housing intersects the side handle and in some cases at the distal end of the striking portion.

It is another object of the present invention to provide a modular law enforcement baton that has sufficient strength to avoid failure or breakage due to strikes against a person or object under normal usage. For example, various embodiments provide reinforcement at the point where the side handle connects to the baton housing, and a conical thread to connect the second end module to the baton housing which provides a solid connection that will not break or become loose with use.

It is another object of the invention to provide for a law enforcement baton with interchangeable modules for performing different useful tasks in a way that such modules can be changed in the field without undue delay or effort. Example tasks are discussed above, in various incorporated references.

Optionally, the interchangeable modules can include one or more of the group of: a flashlight, a flash or a strobe light, a lighted traffic wand, a glass punch, a metal detector, a stun gun, spraying pepper spray or a firing taser, optical scanning, vehicular speed measuring device, a blood alcohol content measuring device, a camera, a video camera, and an audio recorder.

Other components can include a charging module for rechargeable batteries, which can be integrated into the baton housing any module or into the baton housing itself. One embodiment comprises a "smart" baton which is disposed with at least one of a computer memory having at least one of computer instructions for controlling baton functions, a processor, communications, data storage and exchanging data with an external machine. This "smart" baton may also be equipped with a USB or wireless connection for connecting the baton to at least one of another wireless device, a computer, a network and the Internet. If connected to a network or the Internet, the baton is able to communicate with and receive instructions and data from a central station. If equipped with a USB port, said USB port can be utilized for charging rechargeable batteries. Optionally, the wireless connection is Bluetooth®. Optionally, the police baton further comprises an electric input configured to charge the baton. Optionally, this electric input is taken from a USB connector.

Optionally, the first portion is located at a first end of the elongated member and the second portion is located at a second end of the elongated member.

Optionally, the police baton further comprises a pivot on the elongated member of the second end configured to allow the elongated member to be folded.

Optionally, the police baton further comprises a connector configured to replaceably detached from the unit at least one of the first portion of the unit and the second portion of the unit, preferably by standard threads, conical threads or a quick connect/disconnect mechanism.

Optionally, data stored by such a "smart" baton can be saved with a hash-mark or other means for securing a forensic record, such as a cryptographic authentication and/or digital signature. For example, a cryptographic hash of the record and a clock can establish the authentication of the content of the record and its time of creation.

Optionally, the at least one of an accelerometer, a force gauge, and a strain gauge is provided, e.g., positioned in the first portion of the unit. One embodiment comprises a training baton which may optionally not be modular. This training baton is equipped with at least one of an accelerometer, a force gauge, and a strain gauge positioned within the unit and capable of measuring at least one of the acceleration, the force, and the strain to which a police baton is typically subject. In one preferred embodiment, this training baton has a wireless connection to a computer which enables real-time feedback to a trainee, thereby assisting the trainee in developing striking techniques that deliver the desired force (not too little or too much). If desired, the components of this training baton can be included in any module or in the baton housing itself such that a baton deployed in the field can record force used when the user strikes a subject, and this data can be used in legal proceedings at a later time. For example, a training baton may include accelerometers and/or gyroscopes, and provide a data stream communicated over a Bluetooth link, similar to a Nintendo Wii wireless controller.

DETAILED DESCRIPTION OF THE PREFERRED EMBODIMENT

A preferred embodiment comprises a baton having: a baton housing a battery, an electrically powered first module configured to perform at least one first useful function in a first end, an electrically powered second module configured to perform at least one second useful function in a second end, a module being, e.g., at least one of a light, strobe/flash and a camera, the baton housing having a side handle and an externally accessible manual control for at least one of the modules, and a detachable connector between the battery and one of the modules.

A first embodiment provides for a baton housing having a battery housing disposed in a first end, a flashlight module disposed in said battery housing, a detachable side handle located at approximately the middle of the first portion of said baton housing, said side handle having at least one switch or button to control at least the flashlight module and other modules and accessories which may be incorporated into the baton, and a connector at the second end to accommodate a module comprising the striking portion of the baton and at least one additional module for performing another function disposed in the second end of the baton, which additional module may receive power and control from the first end of the baton, or have at least one of its own self-contained power and control mechanism.

The modular design of the baton enables the striking portion to be machined or molded to different shapes and striking surface configurations. Thus, officers in the field can quickly and easily switch between different striking modules designed for different preferences or purposes. For example, some officers may prefer lighter or heaver striking modules. Having different striking modules also enables the baton to be adapted in the field for different functions. For example, an officer patrolling in a wide open area may use a long striking module, but may switch to a shorter striking module when patrolling in a crowed area. A glass break module may be installed when the officer needs to break the window on a car. None of this has been feasible or possible with batons of the prior art.

Figure 14:
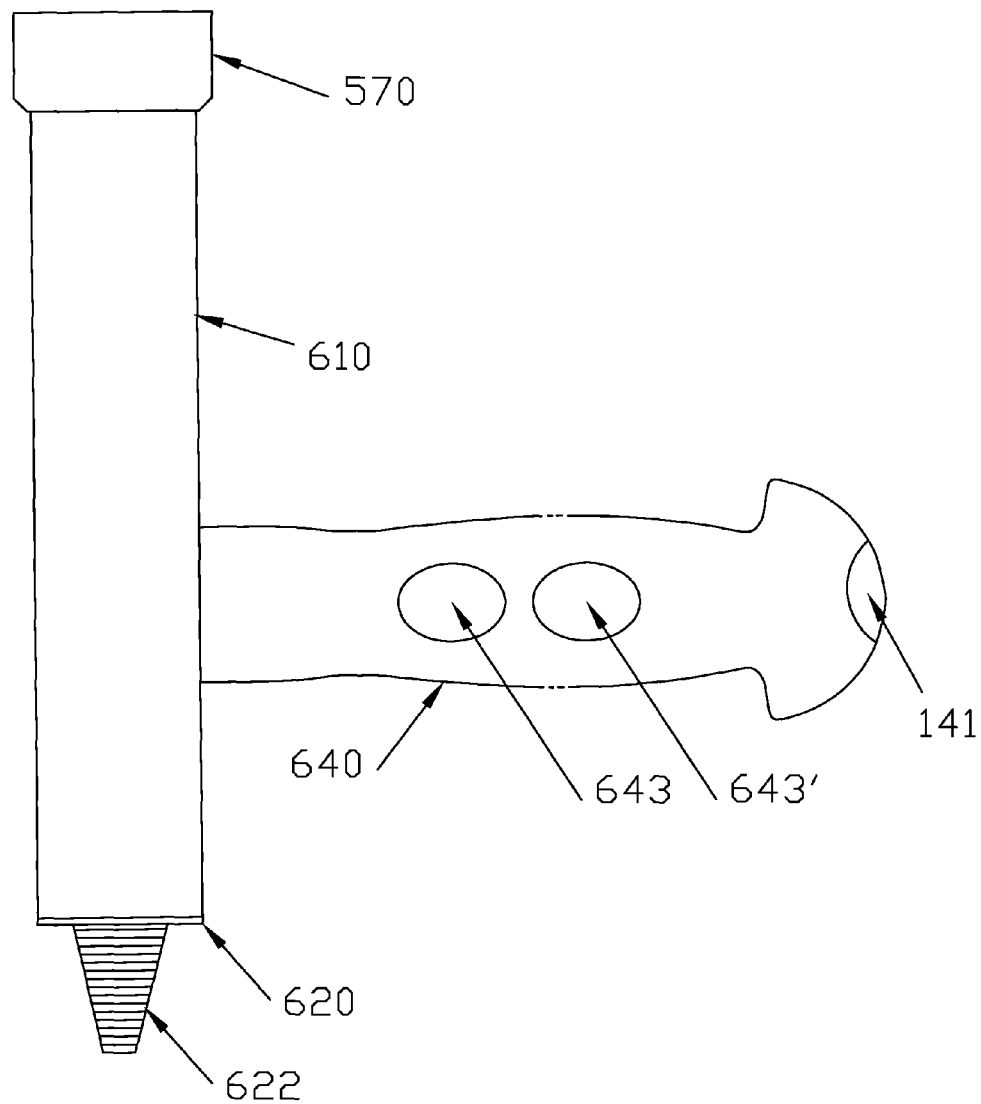
Figure 15A:
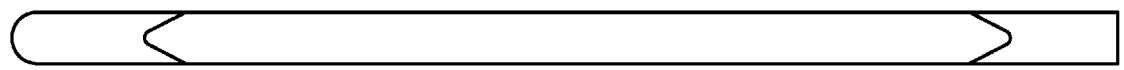
FIGS. 15A-15E illustrate various configurations for the striking module, which is designed to be disposed in the second end of the baton.
Figure 15B:
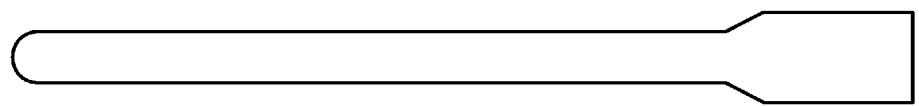
Figure 15C:
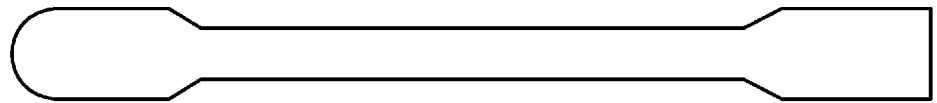
Figure 15D:
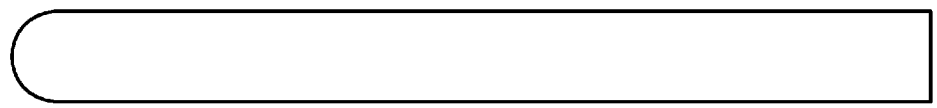
Figure 15E:
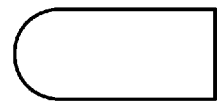

FIGS. 15A-15E show examples of striking modules of various configurations, although the examples shown are only some of the possibilities, and these FIGS. 15A-15E are not intended to be limiting. The connector at the second end may comprise a quick connect/disconnect assembly, for example a bayonet type joint or a threaded assembly such as the conical thread similar to the one shown on the end of the baton housing in FIG. 14, to which modules can be connected. These modules include, but are not limited to: flashlight, flash and/or strobe light, camera, breath alcohol detector, traffic wand, metal detector, optical scanner, glass breaker, pepper spray dispenser, USB or Bluetooth® data exchanger, IEEE-802.11 (WiFi) or broadband wireless. It should be noted that when using a threaded joint or other type of connector, it may be desirable for some modules to have a locking mechanism to prevent inadvertent loosening or removal of the module, particularly by an adversary in combat.

The design of the first end, the battery housing, the side handle, the second end connector and the first and second end modules are such that components can be changed without replacing the entire baton. For example, in the preferred embodiment, the flashlight only module on the first end can be replaced with a module having both a flashlight and strobe/flash by unscrewing one module and screwing in the other. Likewise in this example, the single button side handle that controls only the flashlight is replaced with a two button cross handle with two separate buttons to control the flashlight and strobe/flash. The side handle may also be replaced with a side handle having both the controls for the baton modules and pepper spray. Although wires can be used to connect power and control elements, ideally contacts for power and control are provided in at least one of the first end and the second end, so that when modules are changed at either end the electrical and control connections are made. Also ideally, wire harnesses can be used to connect at least one control button to at least one module.

Although it is desirable to have a separate battery housing and first end module, the battery housing and first end module may be combined into a single unit that itself is a module that can be disposed in and removed from the baton housing.

Figure 16:
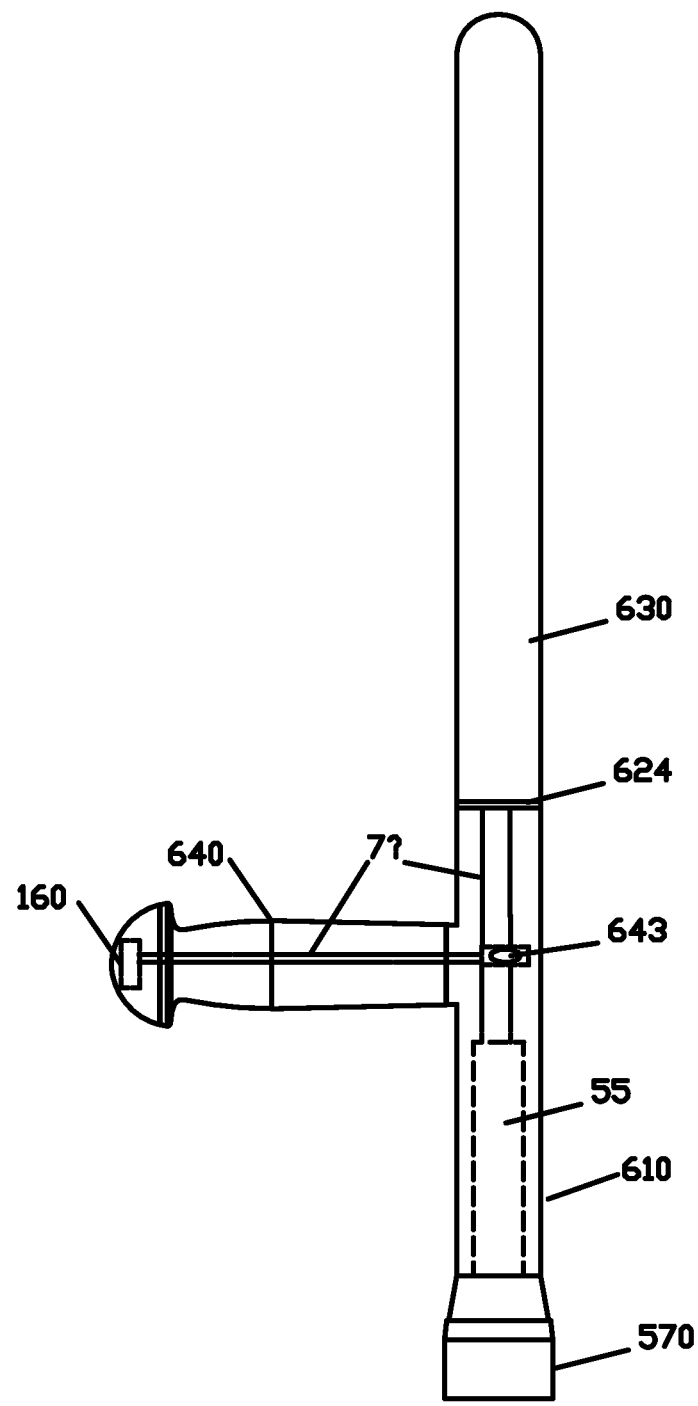
FIG. 16 shows a partial cutaway view of the baton showing electrical connection between a switch at an apex of the side handle, with modules on either end of the baton.

In one embodiment, the baton housing is composed of solid material in the area where the side handle connects, the solid portion having at least one hole to accommodate at least one screw to connect the side handle, and at least one other hole for passing electrical, control and data connections from the first end into the side handle cavity. Ideally, two holes perpendicular to the baton housing and two screws are used to connect the side handle, and the solid portion of the baton housing in the vicinity of the side handle connection has at least one hole running parallel to the baton housing and sized to accommodate a multiple strand wire or wire ribbon, said wire or wire ribbon being channeled from the battery housing in the first end, preferably through a contact or series of contacts, into the side handle. If the second end connector is disposed with at least one of power, control or data connections, then at least one other hole going to the second end enables another wire or wire ribbon to pass to the second end to power a module disposed in the second end, also preferably through a series of contacts. See FIG. 16.

Figure 17:
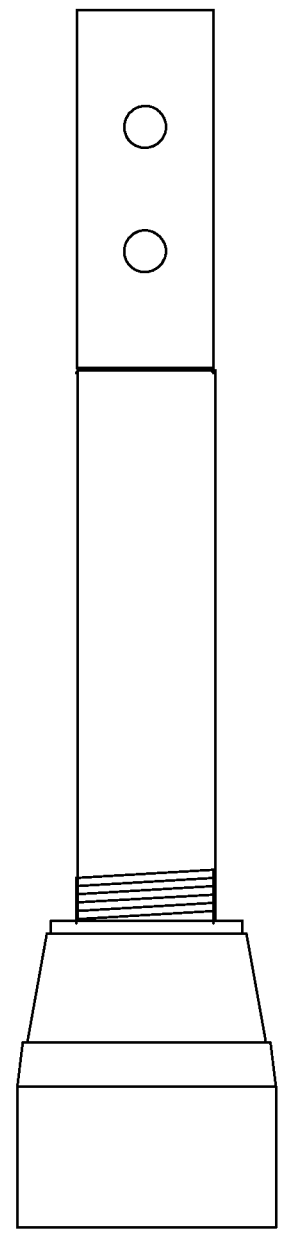
FIGS. 17 and 18 illustrates a flashlight module which has a thread to engage the side handle module, and positioning of the mechanical connections, with a conically threaded insert shown in FIG. 18 for connection to a striking portion module.
Figure 18:
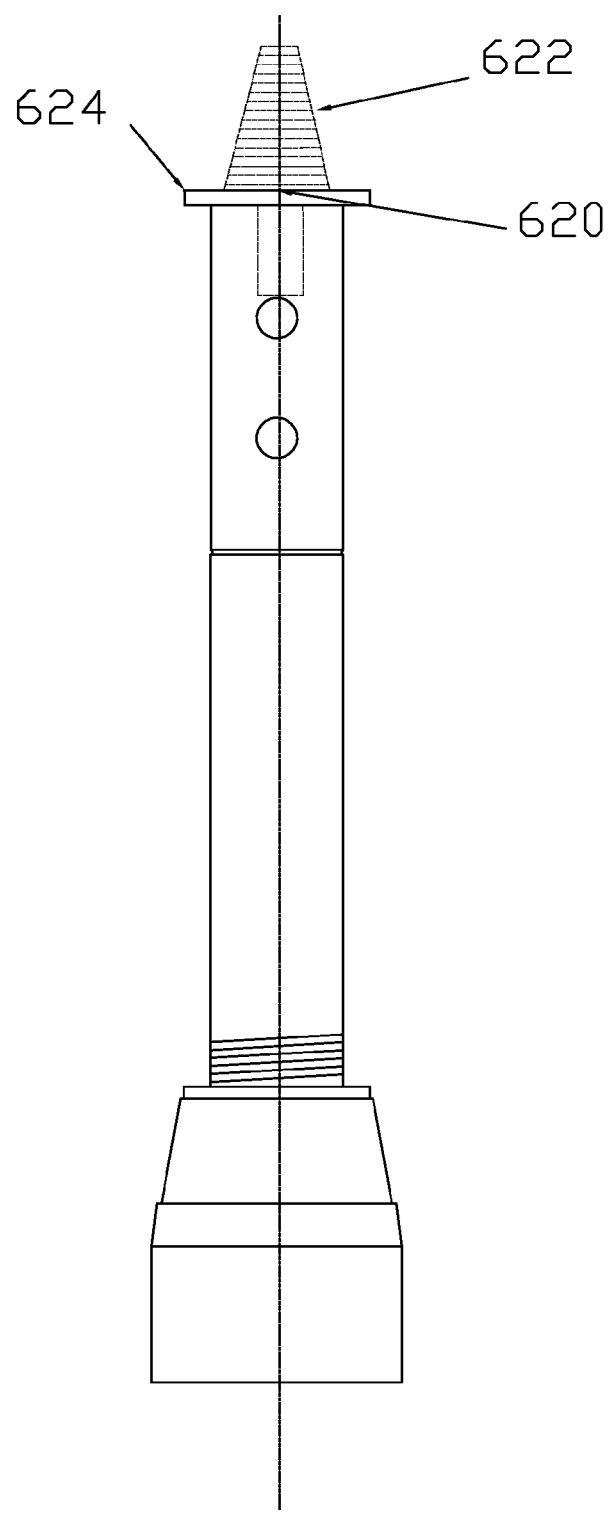

A baton housing with a hollow or partially hollow center cavity may be utilized, and in this embodiment the battery housing may continue past the at least one side handle connection hole and be disposed with a corresponding hole(s) so the side handle screws pass through the battery housing which servers to reinforce the baton housing cavity, as shown in FIGS. 17 and 18. This extra length enables the battery housing to include at least one additional battery if desired, and power, control and data connections are disposed in the battery housing and pass to and from the first end to the side handle cavity and if desired the second end.

When the entire length of the baton housing is hollow, it may also be desirable to have a two part battery housing, where the two parts mate together in the baton housing cavity. Either end of this two part battery housing can be disposed with the at least one hole for the side handle screws, and in this embodiment the second end is disposed with the connector for the second end module and if required at least one of power, control and data connections, so that such power, control and data can pass to and from the battery housing, side handle cavity and second end connector. This embodiment may be modified further to comprise a three part configuration, where the second end connector is a third part that mates into second end of the battery housing.

Finally, a dowel or series of dowels can be used to reinforce the baton housing cavity in the vicinity of the side handle screw(s), and when utilized, these dowels are also used for connecting power, control and data from the battery housing to and from the first and second modules.

In order to prevent vibration of the battery housing when the baton strikes or otherwise contacts a person or an object, it might be desirable to coat the battery housing or baton housing cavity with a silicone rubber or other elastic material, before the battery housing is inserted into the baton housing cavity. This silicone coating seals the battery housing in place when it sets and serves to dampen any or vibration from impact of the baton with a person or object.

In the preferred embodiment, a series of contacts starting at the battery housing module and continuing through to the side handle and in some cases to the second end, deliver power to a circuit board which is connected to at least one control mechanism such as a button, to provide control to at least one module in the first end. Ideally, power and control are similarly delivered to the module in the second end in a similar manner, although any given module attached to the second end may also not require power, for example as striking module, or the module at the second end may have at least one of its own power and control built in, for example a metal detector module which has both its own batteries and switch, or a lighted traffic wand module which takes power from the batteries in the first end, but has its own control button. An energy harvesting system may be provided to power, or partially power, one or more modules. For example, an inertial generator may be provided to charge a battery or capacitor.

Although wires can be used to connect the power and control elements to at least one function in the first end, in one embodiment, a circuit board is disposed in a dowel between the first end and the second end. While providing support to the cavity of the body of the baton and the at least one screw connecting the side handle, this dowel also serves to receive power from the first end through a connector that makes contact when a module is connected to the first end. A circuit board disposed in the dowel receives power from this contact and distributes power to at least one control mechanism such as a button and to at least one function in the first end. This control mechanism or other button can likewise be connected to the circuit board by wire harness or other contact means for making electrical connections. The other end of the dowel has contacts which connect to the connection assembly at the second end, which is also configured with contacts to deliver power to a module disposed in the second end which has corresponding contacts.

In a variation of this embodiment, the circuit board is located in the cavity of the side handle which is accessed through a removable panel in the side handle that is attached by recessed screws or other means for attaching. This panel is disposed with at least one of a switch or a button or other control means which connects to the circuit board for controlling at least one function.

In another embodiment, the circuit board and button (or other control means) are both disposed in the removable panel which connects to the power and control system disposed in the baton housing. This connection can be made with wire harnesses or by contacts when said removable panel is attached.

Utilizing a removable panel (also referred to as a cover plate) in the side handle allows useful functions and control elements to be added to the baton quickly and easily, and in some embodiments makes it possible to mold the side handle into the baton housing to add strength to the baton structure while maintaining the modularity provided in other embodiments with a detachable side handle. For example, a basic baton disposed with a flashlight module at the first end and a single button to control the flashlight, can be quickly upgraded to a module having a combination flashlight and a strobe flash, by removing the flashlight module and single button panel, and replacing them with the combination module and a panel with a new circuit board and two buttons (one to control the light and the other to control the flash). In addition to powering and controlling the functions of modules in the baton, the circuit board contained in the dowel, side handle cavity or removable panel may also contain the computer memory, control and data functions which may be included in the baton. Other advantages to the modular design of the first end include enabling officers in the field to interchange light modules. For example, officers can carry and use light modules of various intensitenties and light beam patterns such as spot lights and flood lights.

Likewise, on the second end, a striking portion module can be interchanged with any module, including but not limited to a shorter or longer or different shaped striking portion, lighted traffic wand, metal detector, breathalyzer, card reader, stun gun, glass break module, etc. Some of these accessories may not require power at all, while others may take power (or supplement their internal power) from the batteries in the first end, while other modules may have their own self-contained power source and control means.

It is further noted that the second end may comprise either a single module or two or more modules. For example, in one embodiment, the optical scanner may be combined with the USB or Bluetooth data exchanger into a single module such that, during a traffic stop, a police officer can scan a driver's license, transfer the data from the scan to a computer, and view the driver's information, including but not limited to vehicle ownership and insurance, on the computer screen. In another embodiment, a flashlight may be combined with a breath alcohol detector. This provides a benefit to the police officer to the degree that the suspect may believe the device to be a regular flashlight and therefore would not try to "breathe away" from it to avoid the breath alcohol detection.

The flashlight module disposed in the first end can also be disposed with other features including but not limited to a flash or strobe to temporary blind a subject before striking, and a camera to record the events prior to striking a subject, etc. In an embodiment with a camera, a mini-USB or a wireless connection such as Bluetooth, WiFi, or wireless broadband may also provided port to load pictures, audio or video to an officer's computer which can later be used to document the behavior of a subject prior to being struck by the baton and to support the officer's reasoning for use of force. In some embodiments, it may be desirable to encrypt the pictures, audio or video data with a hash mark or other marking to provide a forensic record that can be use in legal proceedings. It should also be noted that this camera may be a wireless camera which saves it picture, audio and video data to a remote device such as a computer in the officer's vehicle, the officers hand-held device, or to a central station.

When a USB port is included, the power from the USB port can also be used to recharge the batteries in the baton. A separate charging port may also be provided.

Ideally, the battery housing delivers power to at least one of the side handle for controlling at least the flashlight, and to the connector on the second end for powering the flashlight and other modular accessories, although some accessories (such as the striking module) may not require power, or may have their own power source and control elements built-in (such as the metal detector module).

In the preferred embodiment, power is delivered from the battery housing to the side handle and second end by contacts disposed in the light/battery housing and at least one dowel with corresponding connectors from the battery housing to the side handle. Corresponding connectors on the dowel and the connector at the second end deliver power to the accessory at the second end, which also receives power from corresponding connectors. The dowel also serves to provide strength to the cavity in the first end housing in the vicinity of the side handle, and further provides additional support for the bolt or bolts connecting the side handle to the first end housing.

In one embodiment, power may be delivered from the battery housing to a circuit board, which connects to at least one switch and delivers control and power to at least one of the flashlight or other accessories in the baton body or a module connected to the second end. Buttons controlling the flashlight and accessories are connected to the circuit board with wire harnesses or other means for making electrical contacts.

Continuing on the discussion above, ideally the electrical and control contacts between modules are made through contacts when the modules are attached to the baton housing. These contacts may carry power, control and data to and from the side handle cavity, first end modules and second end modules. One method for making these contacts is to utilize wire ribbon and wire harness connectors. Another method for making these contacts utilizes a system of contacts connected through a dowel or series of dowels.

In a preferred embodiment, the baton housing is constructed with multiple contacts and control paths to accommodate modules with one or more functions. For example, a preferred embodiment can be constructed with three sets of contacts being relayed to the side handle cavity and side handle through similar contacts. The side handle can be adapted to receive a cover plate with circuitry and a button (or buttons). The contacts in the cover plate connect to the contacts in the side handle, and various modules and cover plates may utilize one, two, three or more of these power/control/data paths. So, while the three (or more) power/control paths are built in, a basic light module and a single button in the cover plate might only utilize one of these power/control paths, but the user can change the light module to one that has a light and strobe/flash, and change the cover plate to a two button plate with circuitry for controlling two functions, thus utilizing two of the paths. Another module having a light, a strobe/flash and a camera, and the cover plate with two buttons and the circuitry to record the data and transfer data from the camera might utilize three power/control paths. These examples are not meant to be limiting, but only to illustrate the concept of electrical connections and control/data paths.

In yet another embodiment, the first end can be equipped with a four function module comprising a flashlight, a flash/strobe, a camera and an optical scanner, and the baton will be configured with four power/control paths and two data paths. When functions such as video and optical scanning are incorporated, the contacts will also include connections for the data paths to the circuitry controlling these devices.

Figure 12:
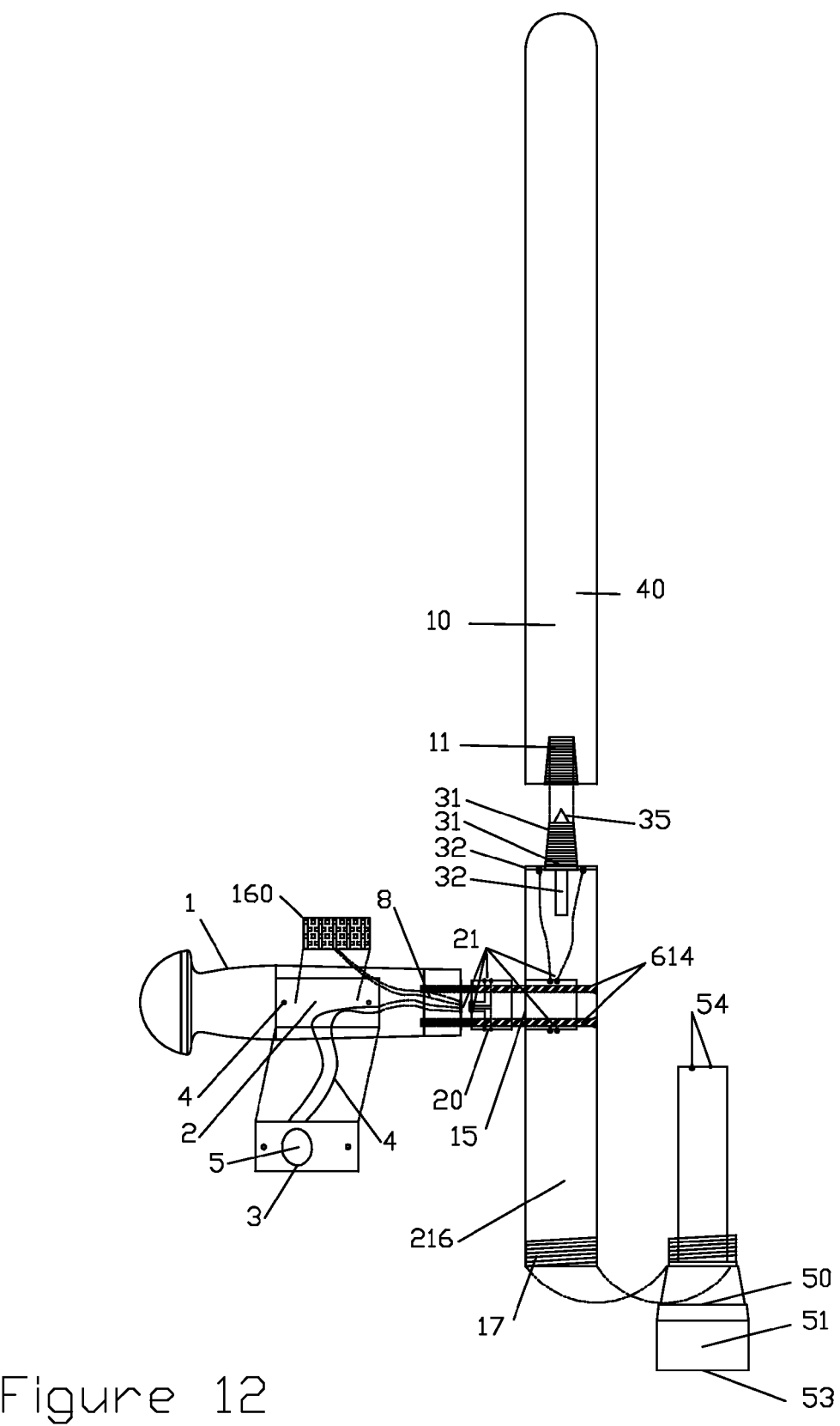
FIG. 12 shows an exploded view of a baton, with a flashlight module activated by a switch in the side handle at one end and a striking module at the other end.
Figure 13:
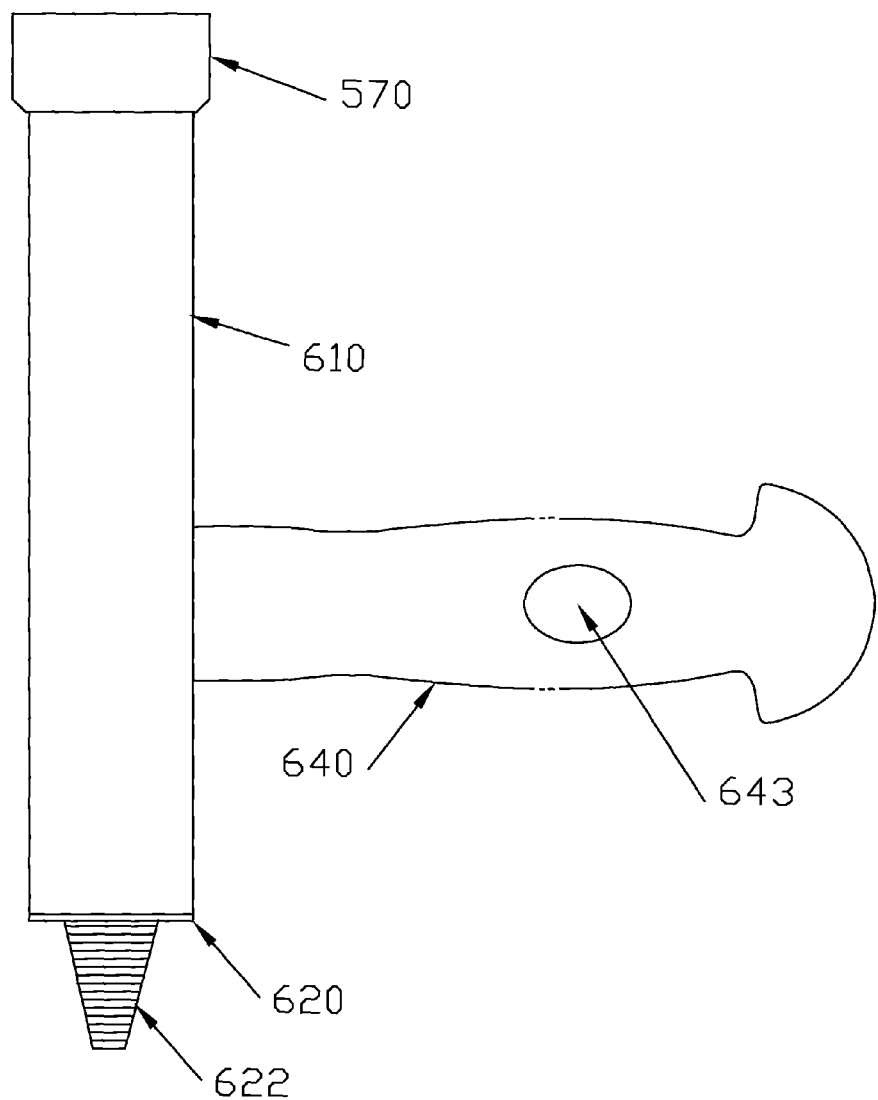
FIGS. 13 and 14 show a view of a side handle with switch or switches, having a flashlight, and a conical thread to receive an optional striking module.

FIG. 12 shows an example of how such power, control and data paths can be configured. A dowel or series of dowels is one way in which power can be transferred. Other means include ribbon wire and wire harnesses. The dowel may out as two pieces, and once the circuitry is assembled the two halves are connected before insertion into the baton housing. In some embodiments, a circuit board may be contained in the dowel instead, or the board 160 may be contained in the side handle cavity or side handle cover plate as discussed above. A one-piece dowel may be provided with a cavity to enable the wiring to enter and exit the side handle cavity and travel from and to the first and second ends. It should be noted that wires can also be run to the dowel on the left which will relay power to the second end.

Figure 22A:
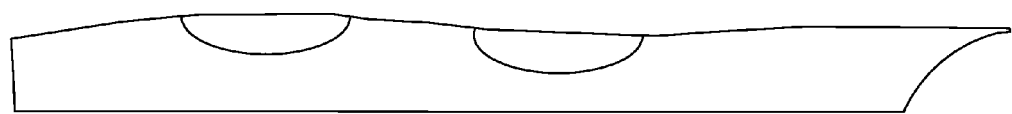
FIGS. 22A-22C illustrate a side handle with a detachable cover plate which is attached to the side handle by screws or other means.
Figure 22B:
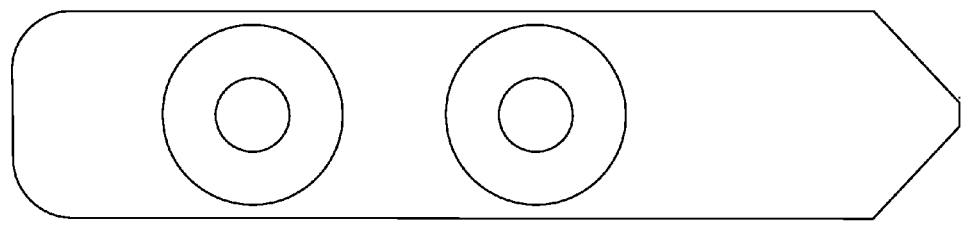
Figure 22C:
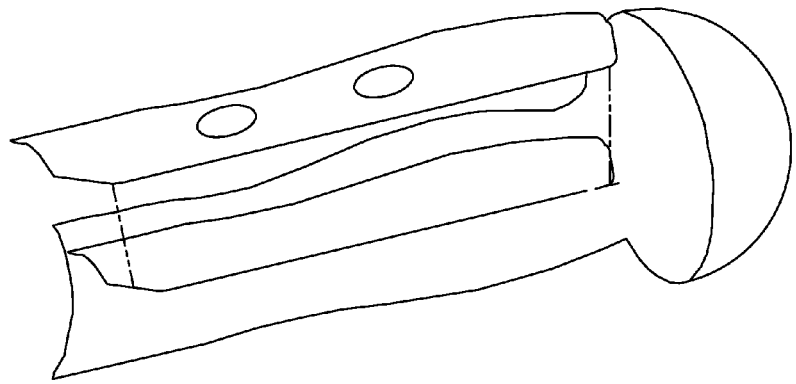

FIGS. 22A-22C show an illustration of a side handle with a changeable plate, said plate accommodating at least one switch or button and connections for controlling at least one device at one end of the baton, and being attached to the side handle by at least one screw. Ideally, in addition to being interchangeable, this cover plate can be changed to correspond with modules that are being changed in the battery housing (one button vs. two buttons).

In one embodiment, the cover plate is disposed with at least one of a switch or a button for controlling baton functions, and provides access to the wiring and circuitry which may be disposed in the side handle cavity. This detachable cover plate can be removed and replaced with a different cover plate to accommodate a change to baton modules. For example, when replacing a flashlight only module in the first end of the baton with a module having a flashlight and a strobe/flash, the cover plate with a single button to control a flashlight module only, can also be replaced with a cover plate having two switches or buttons (or a switch and a button) to control the flashlight and a strobe/flash functions of the new module in the first end.

If desired, the baton circuitry may also be disposed in this cover plate, and contacts disposed in the side handle cavity connect the circuitry when the cover plate is put in place.

Finally, the use of a detachable cover plate makes it possible to build some embodiments with a side handle that is molded into the baton housing, thus adding strength to the baton structure while maintaining the modularity and still enabling buttons and circuitry to be changed in order to accommodate different modules disposed in the baton.

Figure 9:
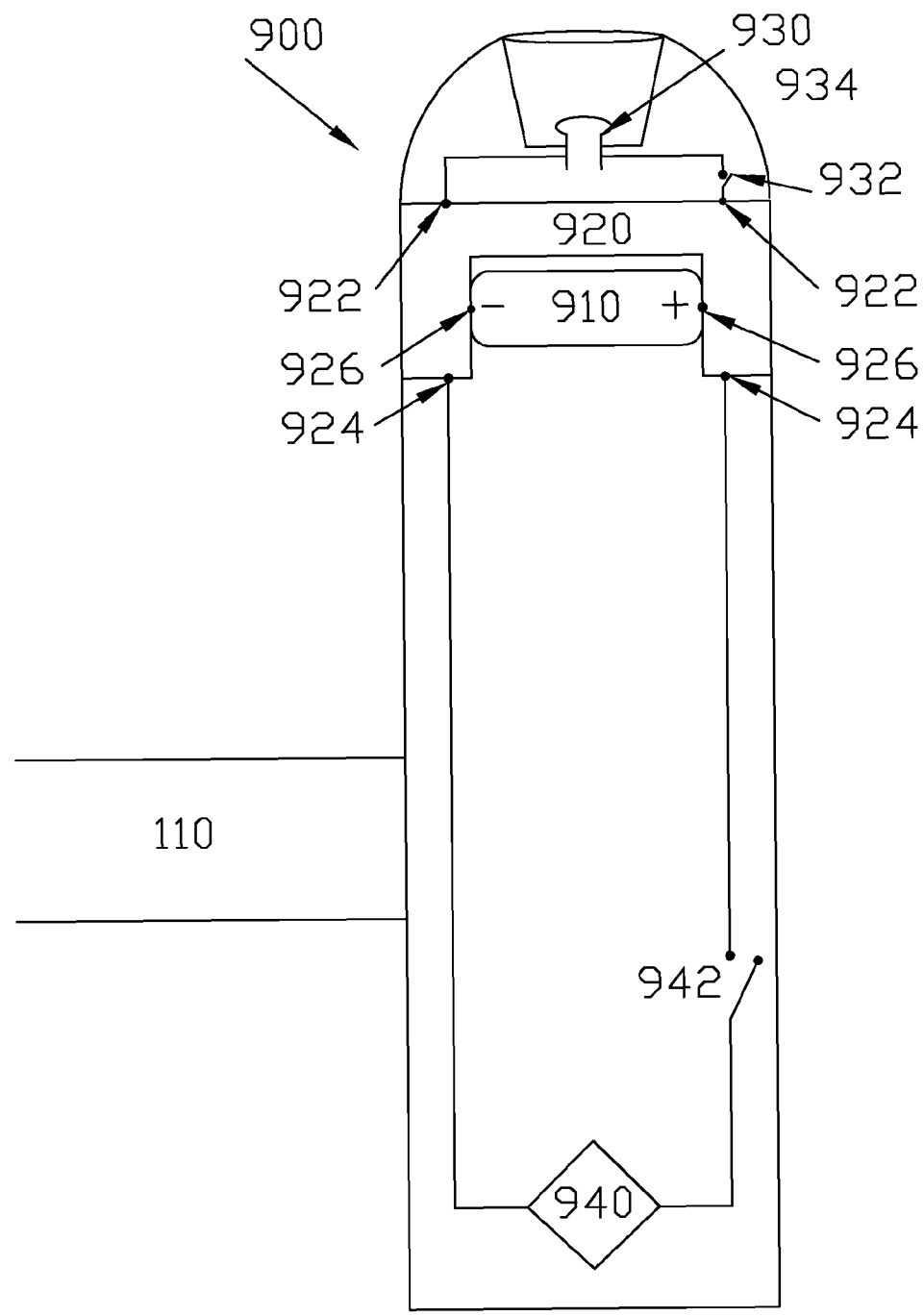
FIG. 9 illustrates a system of providing electric power to an elongated member in a baton, according to an embodiment of the invention.
Figure 10A:
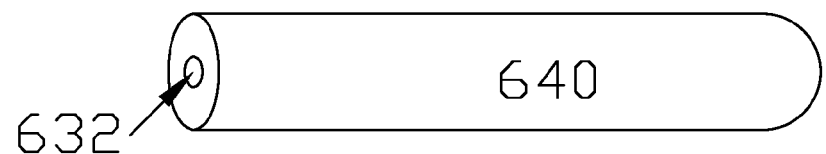
FIGS. 10A-10H illustrate a set of modules that can be connected to the second end of a baton, according to various embodiment of the invention; however, in some embodiments these modules could also be connected to the first end of the baton.
Figure 10B:
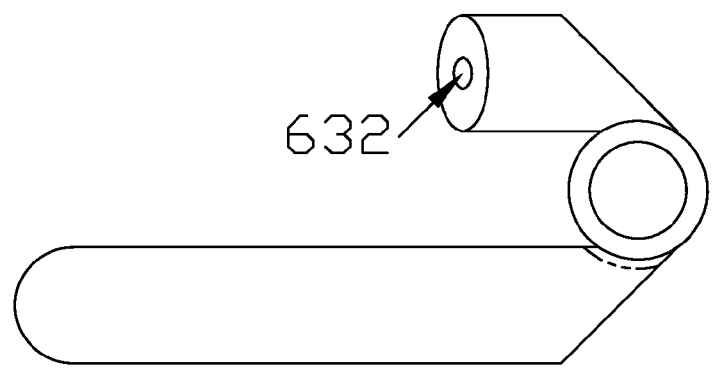
Figure 10C:
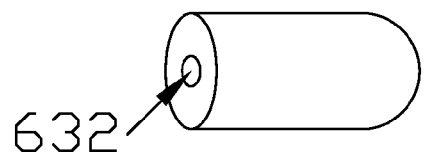
Figure 10D:
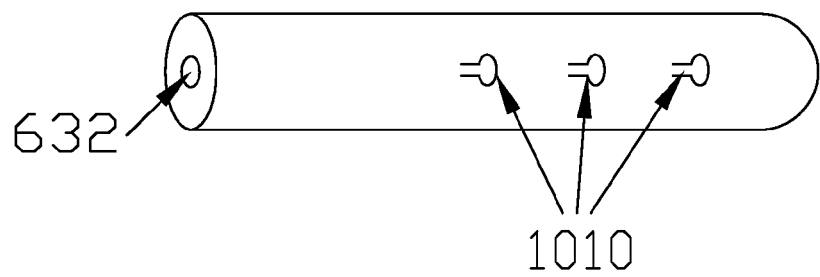
Figure 10E:
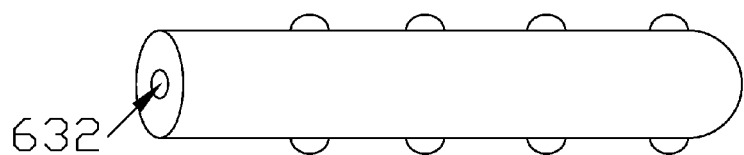
Figure 10F:
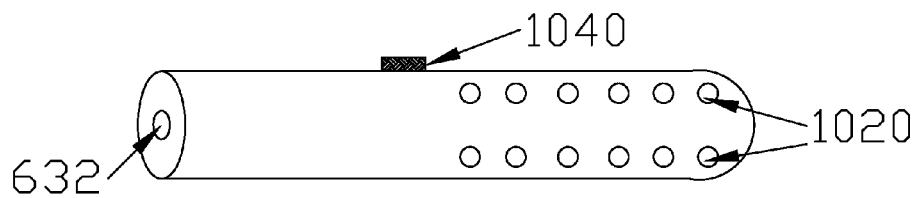
Figure 10G:
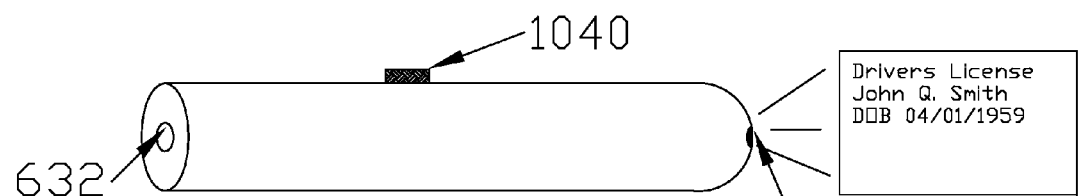
Figure 10H:
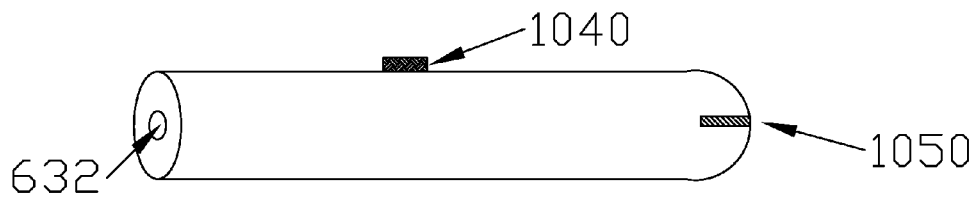

FIG. 9 illustrates an elongated member of a baton 900 according to an embodiment. There is a battery compartment 910 that powers the unit. The battery compartment is connected to a circuit board 920. The circuit board is detachably connected to the elongated member at pins 922, 924, and 926. Connectors 922 serve to connect the circuit board 920 to power the flashlight 930 or strobe light. Connectors 924 connect the circuit board 920 to an additional module 940. Connectors 926 connect the circuit board 920 to the battery compartment 910. In one embodiment, the circuit board is detachable at these locations to assist in changing the light bulb in the flashlight 930 and in replacing the batteries in battery compartment 910. The flashlight 930 has its own switch 932 to turn it on and off. Optionally, there is also a control to activate or deactivate the temporarily blinding strobe light. The additional module 940 can be any module that completes a task useful to typical baton users. If the baton user is a police officer, the additional module can be an optical scanner (as might be used to scan an optical code on a driver's license or acquire other images), a metal detector (to detect weapons on a detainee or a part of a screening) or a breath alcohol detector. It is noted that the additional module 940 has its own switch 942.

Preferably, the flashlight 930 is positioned at an end of the baton remote from the user and pointing away from the user. In one embodiment, the flashlight is covered by transparent thick glass or plastic 934, which is difficult to break, such that the baton can be used both as a non-lethal weapon and as a flashlight. The baton is preferably weighted and balanced to facilitate application of non-lethal force, while avoiding lethal blows. Optionally, the flashlight can be covered with sheet, paint, dye or filter of different colors placed over the thick glass or plastic 934 so as to produce a colored light. This is useful, for example, if the police officer is at a road construction site and wants to alert passing motorists of his presence through a red or blue strobe light. Optionally, the color filter is replaceable. The handle 110 of the police baton is also illustrated for completeness. The handle 110 may also be illuminated.

Figure 8:
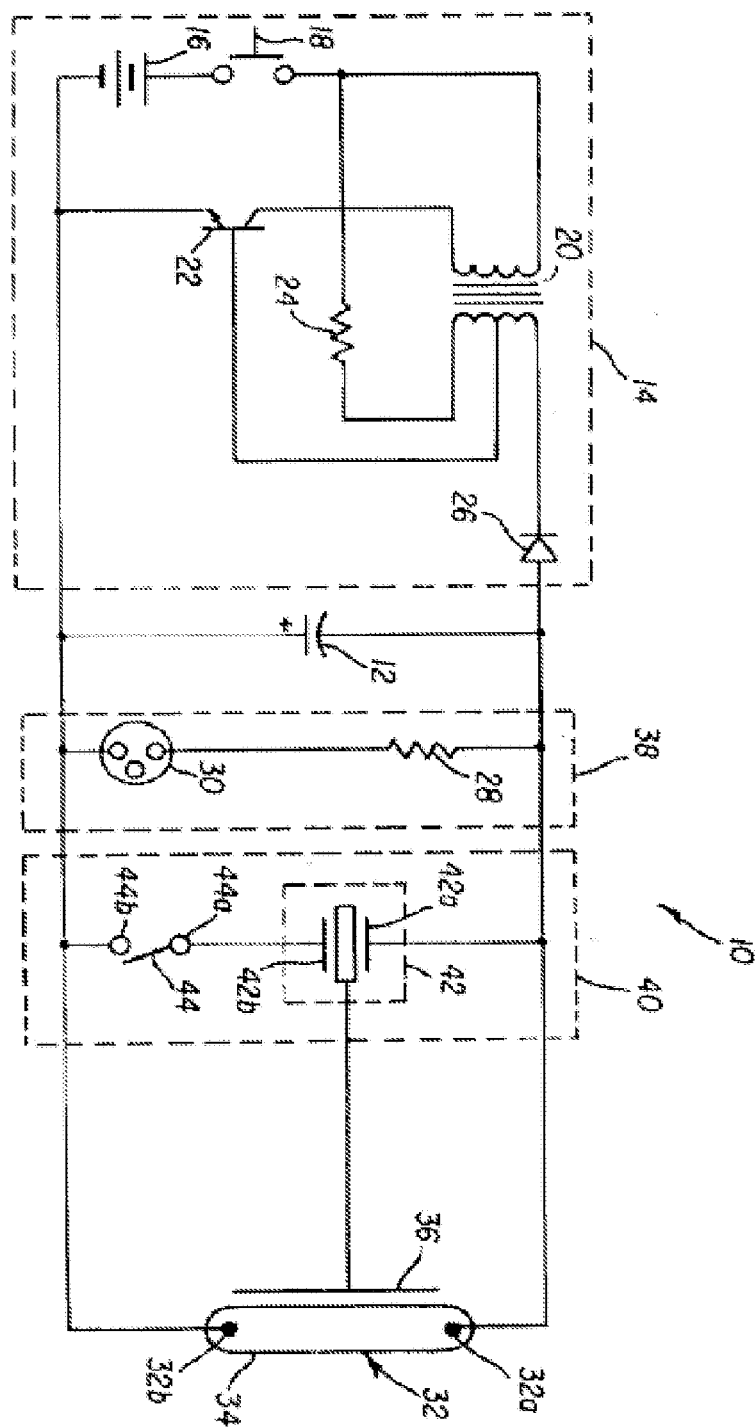
FIG. 8 is a schematic circuit diagram of a prior art flash circuit that can be used to implement an embodiment of the invention.

FIG. 8, copied from U.S. Pat. No. 7,049,760, which is expressly incorporated herein by reference, illustrates a circuit configured to produce a short-lasting flash that would temporarily blind a human. A flash circuit 10 shown therein includes a flash charge storage capacitor 12 and a flash capacitor charging circuit 14 comprised of a battery 16, and a power switch 18, a step-up power transformer 20, an NPN oscillation power transistor 22, and resistor 24. A diode rectifier 26 couples negative-going voltage pulses to storage capacitor 12, to charge the capacitor in known manner, to a negative flash charge voltage of approximately 330 V. It should be noted that the charging circuit shown is basic in nature and that many well known variations of this basic circuit may be employed. A flash ready indicator circuit 38 is usually provided in the flash circuit and includes resistor 28 and a neon lamp 30. The flash circuit also includes a flash tube 32 having a pair of input electrodes 32a, 32b in an envelope 34 enclosing molecules of an inert gas such as xenon. A flash trigger terminal 36 is mounted adjacent the tube envelope in known manner. In this design, a flash trigger circuit 40 is provided that comprises a piezoelectric transformer 42 having input terminals 42a, 42b coupled with the flash charge storage capacitor 12. Of course, other known trigger circuits may be employed, such as inductive boost circuits. In the illustrated embodiment, one of such transformer input terminals 42b is coupled with capacitor 12 through contacts 44a, 44b of a flash trigger switch 44.

In another embodiment, the baton housing or side handle is disposed with pepper spray or a taser, or the pepper spray or taser can be disposed in a module that connects to the second end. In one embodiment, the knob of the side-handle is replaced with a connector for a module that accepts a refillable or disposable canister for dispensing pepper spray.

Figure 5:
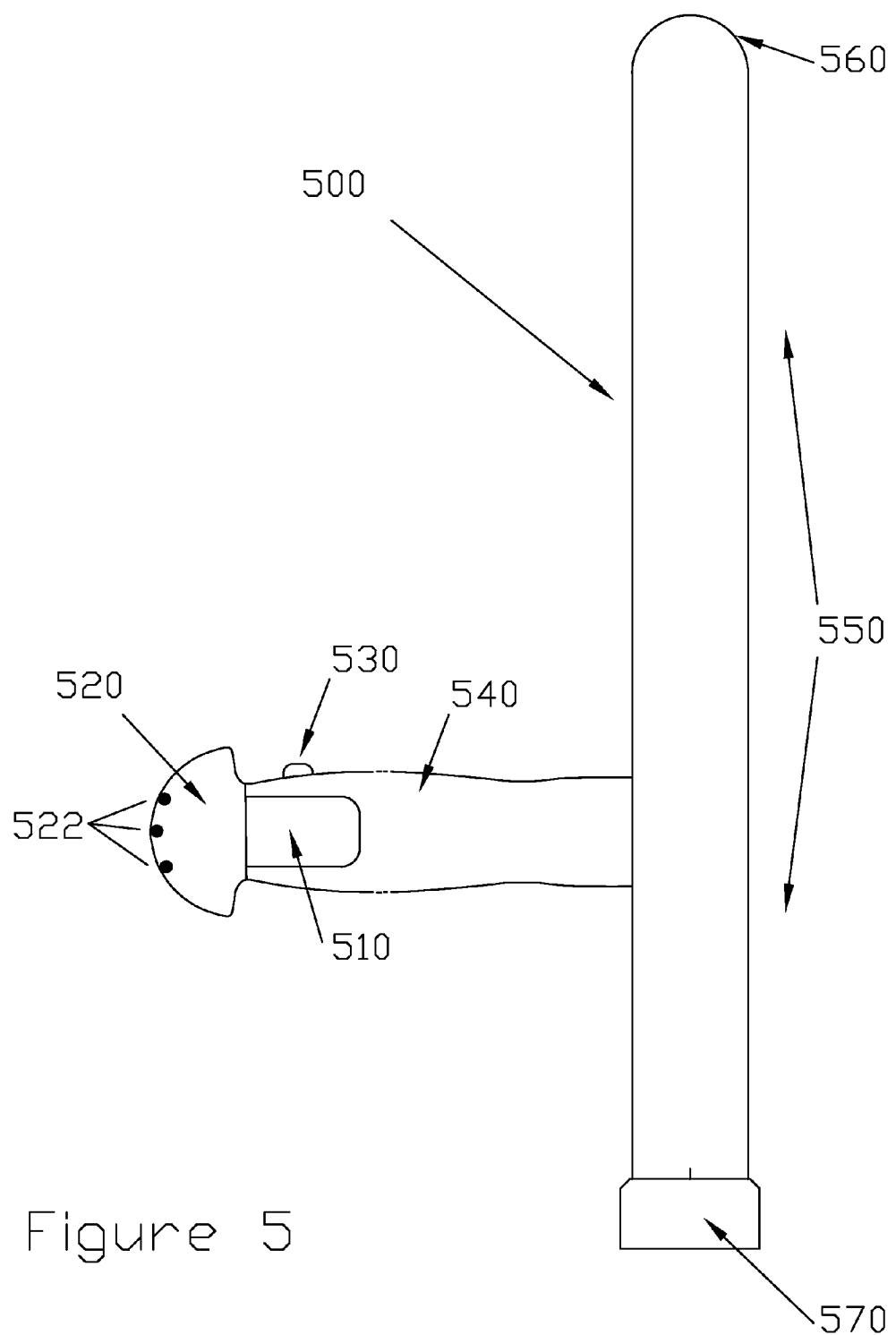
FIG. 5 illustrates a police baton handle comprising a pepper spray or taser container, according to an embodiment of the invention.

This embodiment is illustrated in FIG. 5. The police baton 500 comprises a handle 540 and an elongated member 550. The handle comprises a container 510 in which pepper spray or a taser can be placed. This container is covered by a removable cap 520 which has small holes 522 that can be exposed to allow the pepper spray or taser to be dispensed when the user of the baton wishes to do so. In one embodiment, the cap is screwed onto the baton and can be removed with a screwdriver. In another embodiment, the cap is attached in a removable manner, similar to that used to attach caps to plastic Coca-Cola® (Coca-Cola Company, Atlanta Ga.) bottles. To expose the holes and allow the pepper spray to be extracted, in one embodiment, the user of the baton would press a button 530. In another embodiment (not illustrated) the handle could extract the pepper spray or taser when the baton handle 540 is squeezed in a manner similar to a firm handshake. In another embodiment, the pepper spray can be activated from a removable cap or cover and distributed through a delivery system that runs through the side handle to another part of the baton, and the switch or button dispensing the pepper spray could be recessed in the side handle underneath a cover, such that for example, the pepper spray could be dispensed from an area adjacent to the at least one bolt used to connect the side handle to the housing, and activated by lifting the cover and activating the recessed switch or pressing the recessed button.

Optionally, additional modules such as a flashlight, flash or strobe light, camera, optical scanner, force, acceleration or strain meter, and USB or Bluetooth® WiFI, or wireless broadband computer connectivity, could be placed on the ends 560 and 570 of the elongated member 550 or at other points on the baton 500.

In other embodiments of the invention (not illustrated) the pepper spray or taser container is positioned at one of the ends 560 and 570 of the elongated member 550, instead of on the handle 540. In this embodiment, the pepper spray or taser is ejected through an opening at the end 560 or 570 of the elongated member 550 where it is positioned.

In another embodiment, the striking portion module is disposed with a folding joint which enables the entire baton assembly to be folded to about half of its total length while being carried.

Figure 1:
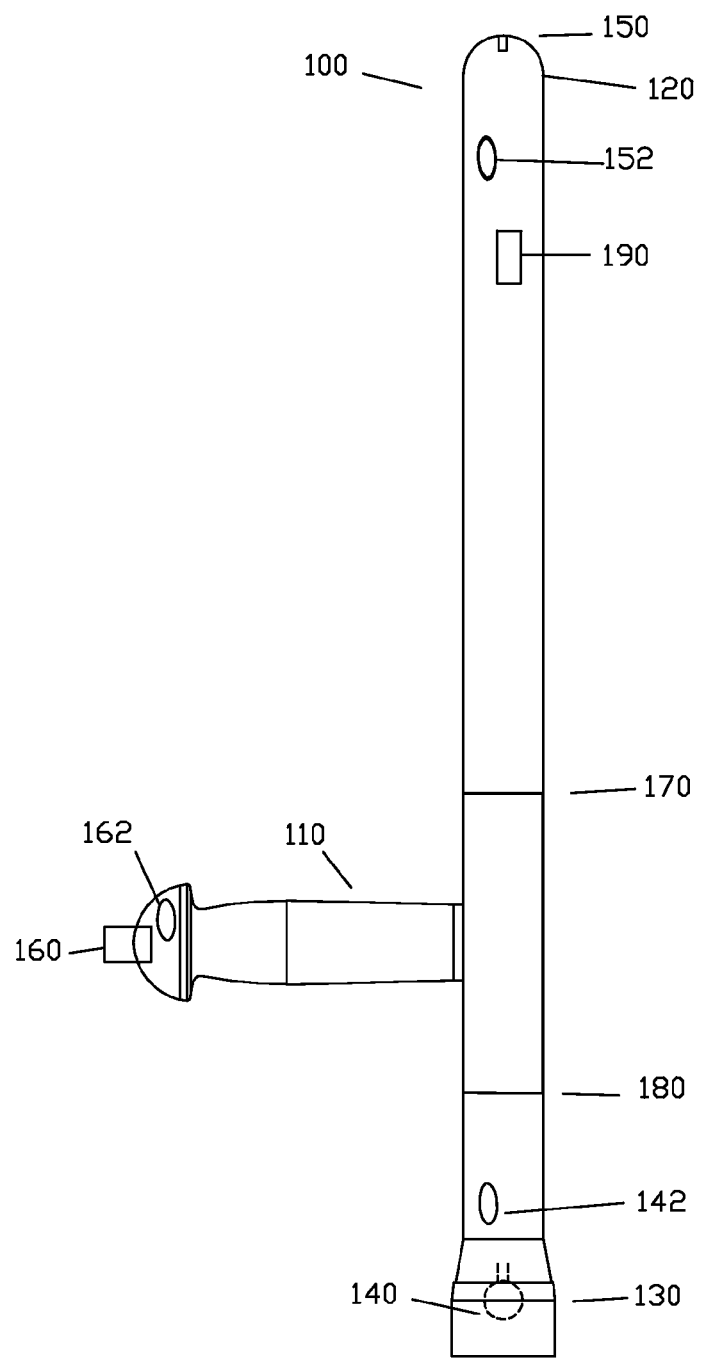
FIG. 1 illustrates a police baton comprising a strobe light module, an optical scanner module, and a USB male port, according to an embodiment of the invention.

In one embodiment, illustrated in FIG. 1, the police baton 100 has a side handle 110 for holding the baton, and an elongated member having a first end 120, and a second end 130. The second end 130 further comprises a stroboscopic light bulb 140 and a switch 142 that switches the stroboscopic light bulb on and off. The stroboscopic light bulb is useful if the police officer needs light or if the police officer needs to temporarily blind or shock a suspect. The various components of the baton are preferably shock resistant, and therefore, solid state and non-fragile components are preferably employed. Therefore, LEDs may be used for both the flashlight illuminator as well as a stroboscopic illuminator. The stroboscopic illuminator preferably has an intensity of greater than 1500 lumens, and more preferably 1800 lumens, and most preferably 2000 lumens.

It is noted that in the illustrated embodiment, the strobe light 140 is operated by a simple switch 142 positioned adjacent to the strobe light. However, in a preferred embodiment, the switch of the strobe light would be more difficult to operate so as to prevent the strobe light being switched on accidentally. For example, the strobe light can turn on only if two buttons are pressed simultaneously or if one button is pulled outward. To build this embodiment, the buttons will connect to two switches, which will be wired in series, and both will need to be in the on position for the strobe light to turn on. When the buttons are not being depressed, both of the switches will be in the off position. In another preferred embodiment, the police officer will have to apply a large pressure to a part of the handle in order to switch on the strobe/flash light. The amount of pressure required is comparable to a firm handshake or a squeeze. It should also be noted that the preferred embodiment of the strobe/flash produces a single high-intensity pulse of illumination from an LED, which in this case is driven from a low impedance capacitor, which allows a stroboscopic pulse having greater power than the battery itself is capable of. A repeating strobe can also be used. Likewise, the strobe/flash element can deliver a defined pattern of strobing and perhaps varying colors, said defined pattern being ones known in the art to be disposed to cause confusion in a subject. One embodiment provides the user a choice whether to flash or strobe, and this may be accomplished by a three way switch, and a button, where the positions on the three way switch are off, flash and strobe, and when the button is depressed the light will flash or strobe if the switch is in either one of those two positions.

Another means of assuring against accidental discharge of a flash or strobe light is to utilize a switch that returns to its home position after being actuated. Activating this switch arms the flash for a predetermined period of time, and if the flash button is pressed during this time the flash discharges. If the predetermined period of time passes, the flash is disarmed to prevent accidental discharge. In an embodiment with both a flash and a strobe, a three position arming switch or two arming switches can be utilized for this purpose.

The first end 120 comprises an optical scanner 150 configured for scanning bar codes off driver's licenses or other documents, or license plates to verify the authenticity, validity, and other information associated with a subject or vehicle. The optical scanner has a switch 152 for turning the scanner on and off. In its preferred embodiment, the optical scanner is located in the flashlight housing, reads the license or other item, and transmits the information to a central location (either directly to a central location or through another device such as the computer in the officer's vehicle as a relay to a central station) for processing. Ideally, Bluetooth®, Zigbee®, or WiFi is used to transmit to another device, and repeater or wireless bridge used to enable the baton to communicate directly with a central location. Alternately, a cellular radio may be employed. A vibration or other silent alert may be used to communicate matters of interest to the user. For example, a single vibration can be used indicate that the scanned data has been read and received by the central station. An audible indication is also possible. When the scanned information is processed, preferably automatically at the central station, the results are transmitted back to the baton which delivers patterns of vibration (or other type of silent signal). These patterns may occur once or repeat for a designated number of times or over a designated period of time. For example, two vibrations to indicate the information has been processed and there are no issues, three vibrations to indicate the license is suspended, and four vibrations to indicate an outstanding warrant. The foregoing example is not meant to be limiting, but to demonstrate one of the many possibilities. Ideally, the system for processing the scanned data returns the information to the baton automatically without human intervention. The system can also be programmed to alert dispatch and/or other officers when a status such as a suspended license or warrant is returned. Thus backup can be dispatched to the scene efficiently and silently, without alerting the subject. In such cases, another silent signal can be sent to the baton to indicate to the officer that backup has been dispatched and is on the way. This silent signal pattern indicating backup has been dispatched can also indicate the estimated time of arrival of the backup. In place of vibrations, in some embodiments, it may be desirable to use a light or series of lights to flash in various colors or patters to indicate status information. The device might further comprise a speaker (not illustrated) configured to provide one sound (e.g. a single beep) when a driver's license is read and another sound (e.g. a siren or plurality of beeps) if there are matters of interest to the police officer. When a speaker is used, ideally the speaker in an officer's headset is used so the audible signal can be heard by the officer and not the suspect. Potential matters of interest include license invalidity, suspension or other restrictions. This optical scanner can also be used for other matters of interest. For example, it can be used to scan business licenses to read or find emergency contact information on a business establishment, and relay that information to the officer's computer or handheld device.

The data scanned with the optical scanner can also be stored in a memory for transfer to another device so the officer can use the data at a later time, for example writing reports or citations. This can enhance safety, for example, by allowing officers to process stops quickly and issue summons by mail at a later time when in a safe location. It can also make the process of traffic stops more efficient. For example, when doing speed enforcement, the number of stops that an officer can make is limited by the time it takes for the officer to input the driver's information and write the ticket. The use of the optical scanner can enable faster processing of speeding stops, allowing officers to make more stops more efficiently while in the field, and to process the tickets at a later time. In one embodiment, the scanned data is transmitted to the computer in an officer's vehicle which opens a form and populates the driver's data into the form. The officer can input in the offense information and other relevant information, including notes on the driver's statement into the form. This can be done either now or at a later time from field notes. The officer then has the option to either issue the summons immediately or save the form to input the relevant information and issue the summons at a later time by mail. If desired, the radar unit may communicate with the computer and used to populate speed and other relevant data into the form.

Figure 11:
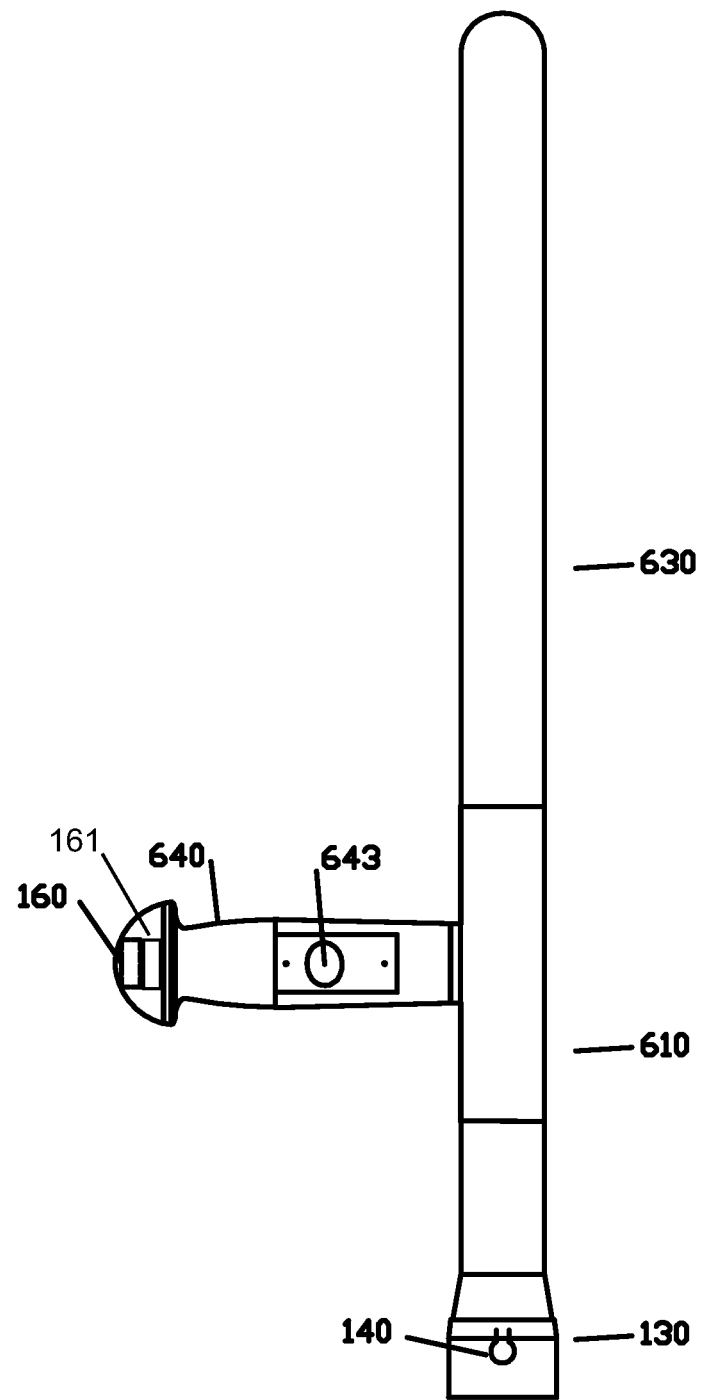
FIG. 11 illustrates an embodiment showing switches on the side and end of the side handle.

The side handle 110 further comprises a universal serial bus (USB) connector 160, which may be a micro USB connector, so that the baton can be connected to a laptop or desktop computer. A cable interface may be employed for this purpose. This would allow the police officer to review the information gathered by the baton in more detail. For example, if the police officer is issuing traffic tickets, a driver's license of a violator can be scanned with the optical scanner, and then the baton can be connected to a laptop computer, which will then record the information about the violation (entered by the police officer) along with the information about the violator (obtained from the driver's license and the records of the Department of Motor Vehicles or similar state agency). In another embodiment, if the police officer scans a driver's license and is informed (for example, through a special sound, as described above) that there are matters of interest associated with the driver's license, the police officer can connect the baton to a computer in order to ascertain the identity of the matters of interest. Switch 162 opens the USB male connector. In a preferred embodiment, the USB male connector is closed into the baton when it is not excuse so as to prevent damage to the connector wires. It is noted that, the USB connector can be used to charge the batteries in the baton that are used to operate modules such as the optical scanner 150 and strobe light 140 illustrated herein. In another embodiment, the USB male connector is replaced with a wireless connector 161 (shown in FIG. 11), such as Bluetooth® connectivity or WiFi. If Bluetooth® or WiFi is used, the data from the baton can be viewed on a cell phone or a smartphone, such as an Apple iPhone® or Google Droid®. A wired or wireless broadband connection can transmit the data directly to a central location, either directly through a private network, or through the Internet.

In one embodiment, the police baton 100 further comprises at least one of an accelerometer, a force gauge, and a strain gauge 190 positioned near the first end of the elongated member 120. This is the optimal location for the accelerometer, force gauge, or strain gauge because it will measure the acceleration, force, or strain that the police officer is applying to the suspect. The accelerometer, force gauge or strain gauge is small enough to fit inside the police baton and accurate enough to measure the acceleration, force or strain typically applied to the baton by a police officer, especially when the baton is used to apply force against a suspect. Exemplary accelerometers that can be used in embodiments are available from Analog Devices, STM Microelecronics, and Freescale Semiconductor. The data from the accelerometer, force gauge, or strain gauge can be transferred from the baton to a computer or handheld device through the USB or Bluetooth® or WiFi connection. An advantage of the accelerometer, force gauge or strain gauge is that it can be used to determine the amount of force that the police officer is using against a suspect. This is useful in a number of areas, including training, as evidence in a court case and in internal police department brutality investigations. When used in the field, recorded data on striking force may be encrypted, or forensically secured with a hash or digital signature so as to provide a forensic record of the force data that can be used as evidence in court proceedings.

It is noted that the positions of the strobe light, optical scanner, and USB connector are exemplary and other positions on the baton may be used instead of the ones illustrated and described here. For example, the USB male connector may be located between the first end 120 and the second end 130 of the baton, instead of on the handle 110. It is possible for both the strobe light 140 and the optical scanner 150, as well as a camera (not illustrated) to be positioned at the either the first end or the second end 130. The advantage of this embodiment is that the camera will record all of the police activity and be useful for proving the action or inaction of the police, as well as the level of force used, in court and in internal police department investigations.

It is also noted that other features can replace the ones that are illustrated here. For example, the baton can comprise a pepper spray container and dispenser. Pepper spray is useful to police officers because it creates a feeling of temporary blindness and discomfort in subjects, often without any long term damage. This allows the police officer to arrest the victims safely without endangering either himself or the subject of the pepper spray.

In another embodiment, one end of the police baton can comprise a radar, LIDAR (light detection and ranging), or laser gun configured to measure the speed of moving vehicles. Such a device is useful to police officers because it allows them to ascertain whether a vehicle is violating a traffic law. In such an embodiment, the data provided from the speed detection module can be wirelessly communicated and saved to a computer in the officer's police vehicle. In a variation of this embodiment, the unit is also equipped with audio and video which can likewise be saved to the computer, thus providing more complete evidence record for use in court proceedings. If desired data on speed can be cryptographically authenticated to provide a forensic record that can be used in court proceedings.

Optionally, the first end 120 and second end 130 of the elongated member are replaceably detachable along detachment locations 170 and 180, and replaceable with other modules. Many means of detaching and replacing the modules can be used. For example, the modules can be screwed in or form fit into a recess, or can utilize a quick connect/disconnect method such as a ball-pin connector or bayonet type joint. This feature is beneficial because police officers need different tools for different tasks. For example, if a police officer is patrolling traffic on a highway, an optical scanner and a breath alcohol analyzer might be the most useful modules to connect to the baton. However, if the police officer were patrolling violent crimes in a dangerous neighborhood, he might replace the optical scanner and breath alcohol analyzer with a strobe light, pepper spray dispenser and striking module. The advantage of a quick connect/disconnect joint provides an officer with a faster means of changing between modules for various tasks.

Figure 2:
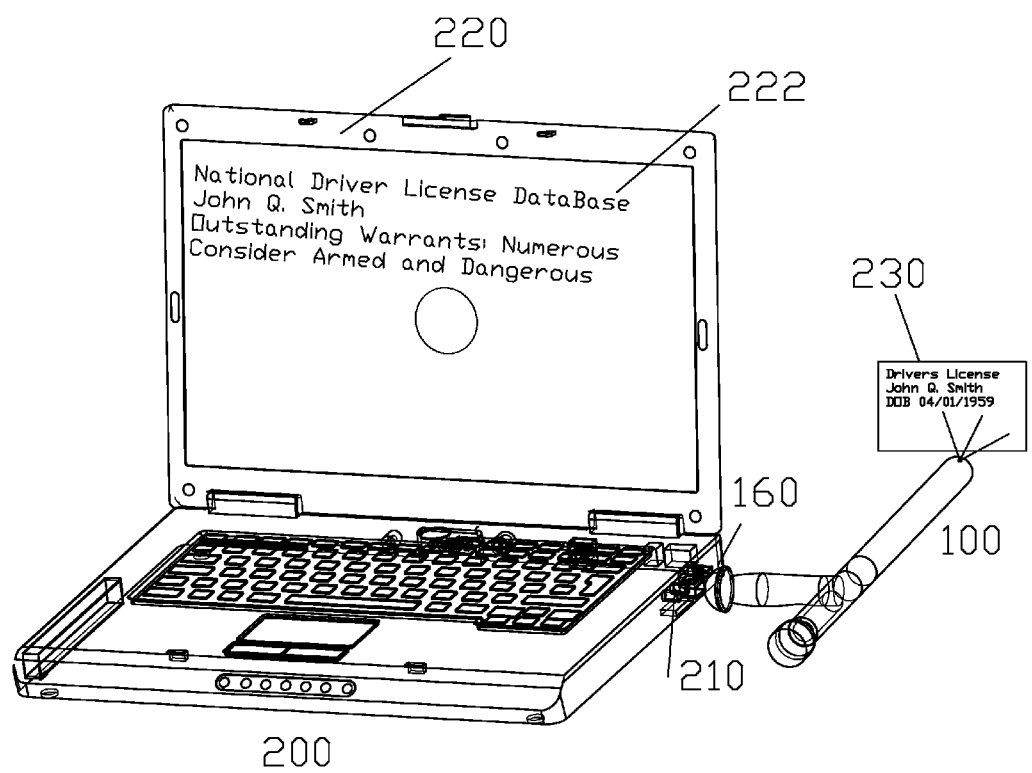
FIG. 2 illustrates a police baton connected to a laptop computer via the USB port, according to an embodiment of the invention.

FIG. 2 illustrates a baton 100 connected to a laptop computer 200 via the baton's USB male end connector 160 and the computer's USB female port 210. The optical scanner on the baton 100 has just scanned driver's license 230 and indicated to the police officer that there is a matter of interest, prompting the police officer to connect the baton 100 to the laptop 200. The laptop has a screen 220, which is configured to display the driver information from Department of Motor Vehicles (DMV) records based on a license scanned by the baton. The DMV records could be accessed over the Internet via a secure or private network. Alternatively, they might be stored directly on the police officer's computer 200. This information is displayed on the screen 220 in window 222. For example, the name of the driver and information of interest could be displayed. In the illustrated example, it is noted that the driver's name is James Green and Mr. Green's driver's license is suspended for failure to pay child support. The police officer can now take appropriate action and dispatch is alerted to send backup immediately. The major advantage to this system and method is that it enables the license check and dispatching of backup to be done silently and quickly, without alerting the suspect to the process. For example, if Mr. Green was driving a motor vehicle at the time the police officer stopped him, Mr. Green could be cited or arrested for driving on a suspended license. In one embodiment, (not illustrated) the USB connection between the baton 160 and computer 210 is replaced with a wireless connection, such as Bluetooth®, Zigbee®, or similar technology. It is also noted that any computing machine with a display, such as a cell phone, smart phone, iPod, iPad, etc. can replace the laptop computer to implement an embodiment.

An additional function of the USB male port (or USB micro female port) in the baton is to allow the baton to be charged by connecting it to a computer, a wall charger with a USB converter, or a vehicle charger with a USB converter. The charge is necessary for the optical scanner and the strobe light to function effectively. In another embodiment, the baton has a replaceable internal battery. In yet another embodiment, the baton comprises a wall charging port or a vehicle charging port, similar to those provided for cell phones, digital music players, and other portable electronic devices. With the exception of charging, many of the functions that can be performed by USB connection can also be performed by any wireless connection including but not limited to WiFI or Bluetooth® and wireless broadband.

Figure 3:
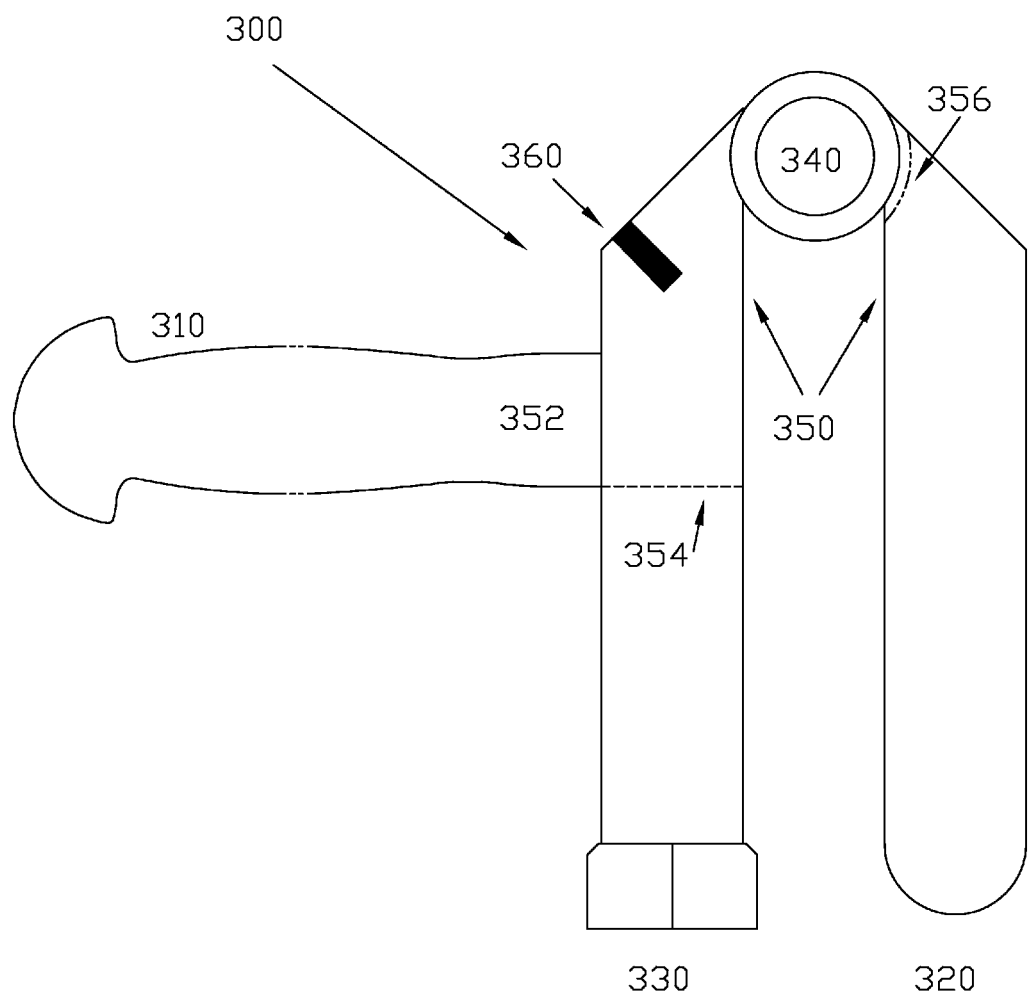
FIG. 3 illustrates a foldable police baton that can be stored easily, according to an embodiment of the invention.
Figure 4:
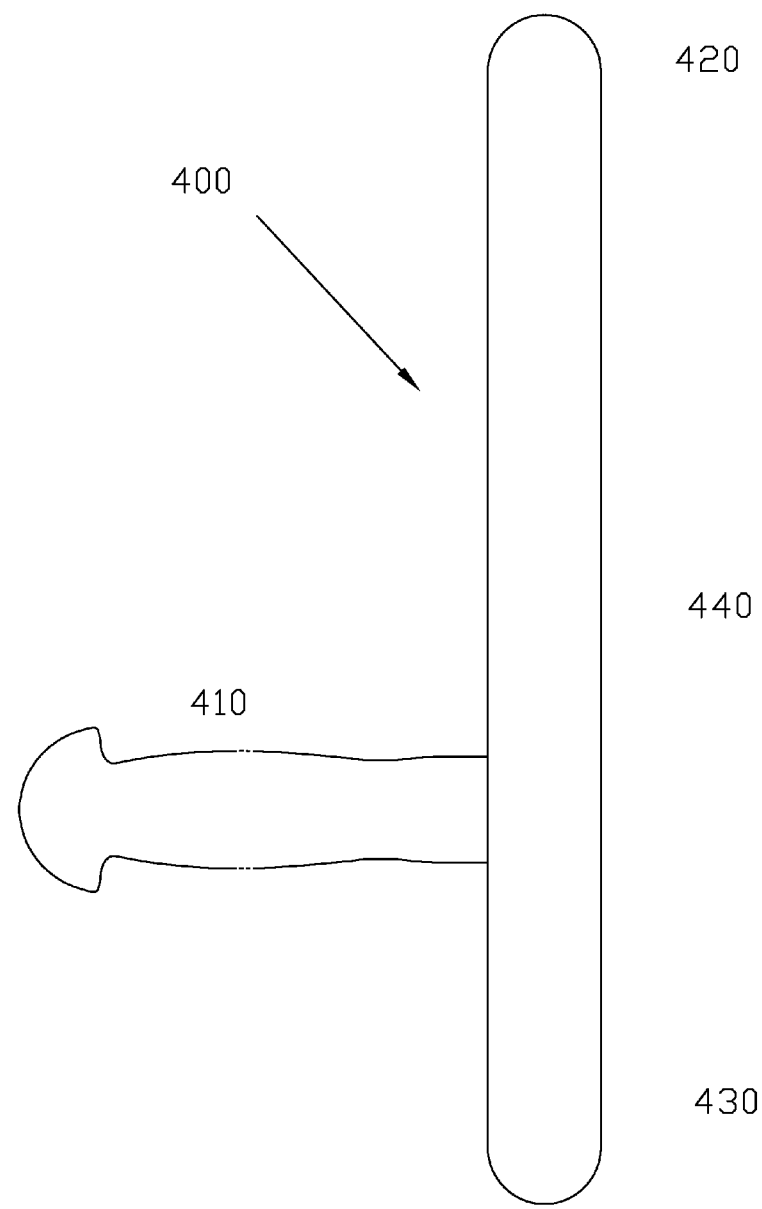
FIG. 4 illustrates a prior art police baton.

FIG. 3 illustrates a folding baton according to an embodiment. The folding baton 300 comprises a side handle 310 and an elongated member 350 with two ends 320 and 330. It is noted that accessories such as a radar gun, a stroboscopic flashlight, a pepper spray container, or an optical scanner may be placed on the baton at positions 310, 320, 330, and other positions. A folding joint 340 in the middle of the elongated member allows for the elongated member to be folded along the joint, thereby making it easier to store the baton when it is not in use or when it is charging. Optionally, the side handle and the two ends of the elongated member are replaceably detachable. The detachment can take place, for example, at detachment locations 352, 354, and 356. Many different replaceably detachable structures can be used to implement this embodiment. Preferably, a quick release button or joint 360 is provided to allow for the fast opening of the baton if the user decides it is necessary.

Figure 6A:
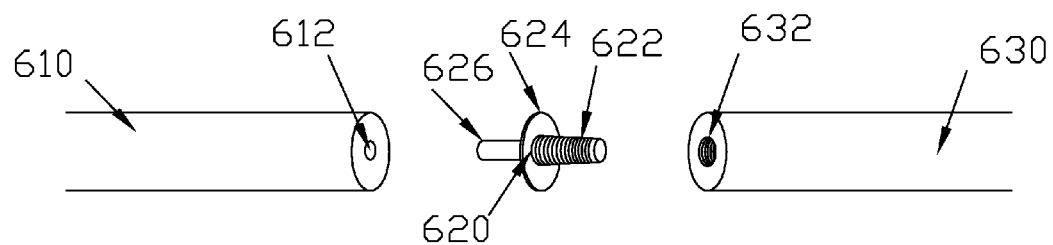
FIGS. 6A-6C illustrate an exploded view, partially assembled view, and assembled view, respectively of a police baton having a connector, according to an embodiment of the invention.
Figure 6B:
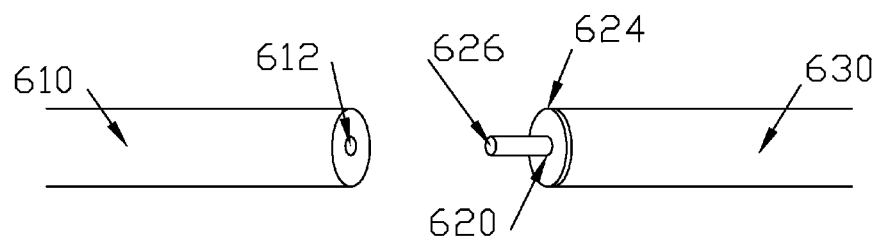
Figure 6C:
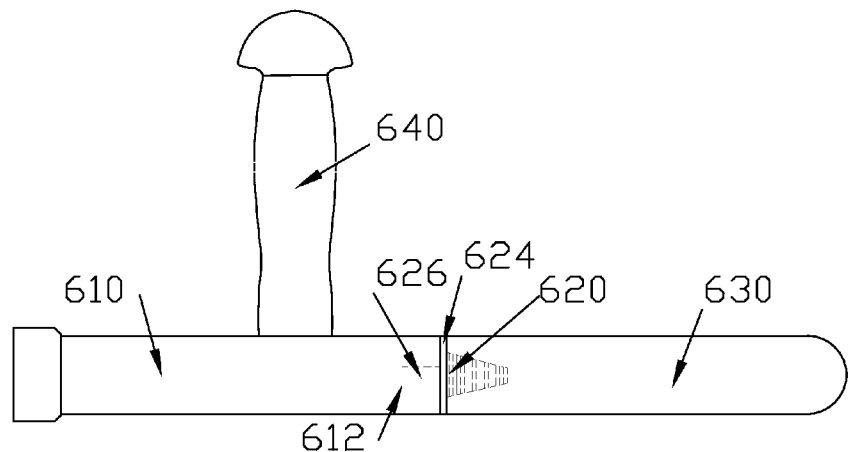

FIGS. 6A-6C illustrate various exploded view and an assembled view of an embodiment showing how an attachment/detachment position on the baton, such as 170 and 180 in FIG. 1 can operate.

FIG. 6A illustrates a connector 620 for a first cylindrical member 610 and a second cylindrical member 630. The connector 620 has a roughly flat circular member 624 in the middle. One side has a screw 622, which is configured to enter into a screw hole 612 in the circular base of the first cylindrical member 610. The other side of the connector 620 has a pin 626, which is configured to be pinned into a pin hole 632 in the base of the second cylindrical member 630. When pieces 610, 620, and 630 are combined, they produce an elongated cylindrical member that can be separated back into its component parts.

FIG. 6B illustrates the configuration of FIG. 6A after 610 and 620 are combined into a single unit by inserting screw 622 into screw hole 612. The roughly flat plate 624 is adjacent to the cylindrical member 610. Pin 626 extends outward from the cylinder/connector combination so as to allow itself to be placed inside pinhole 632 in cylindrical member 630.

FIG. 6C illustrates the configuration of FIG. 6B after the pin 626 is inserted into the pinhole 632. The two cylindrical members 610 and 630 are visible, as is the roughly flat plate 624 from connector 620. Note that the two cylindrical members 610 and 630 combine to form the elongated member of a baton. A handle 640 may also be connected to the baton.

Figure 7:
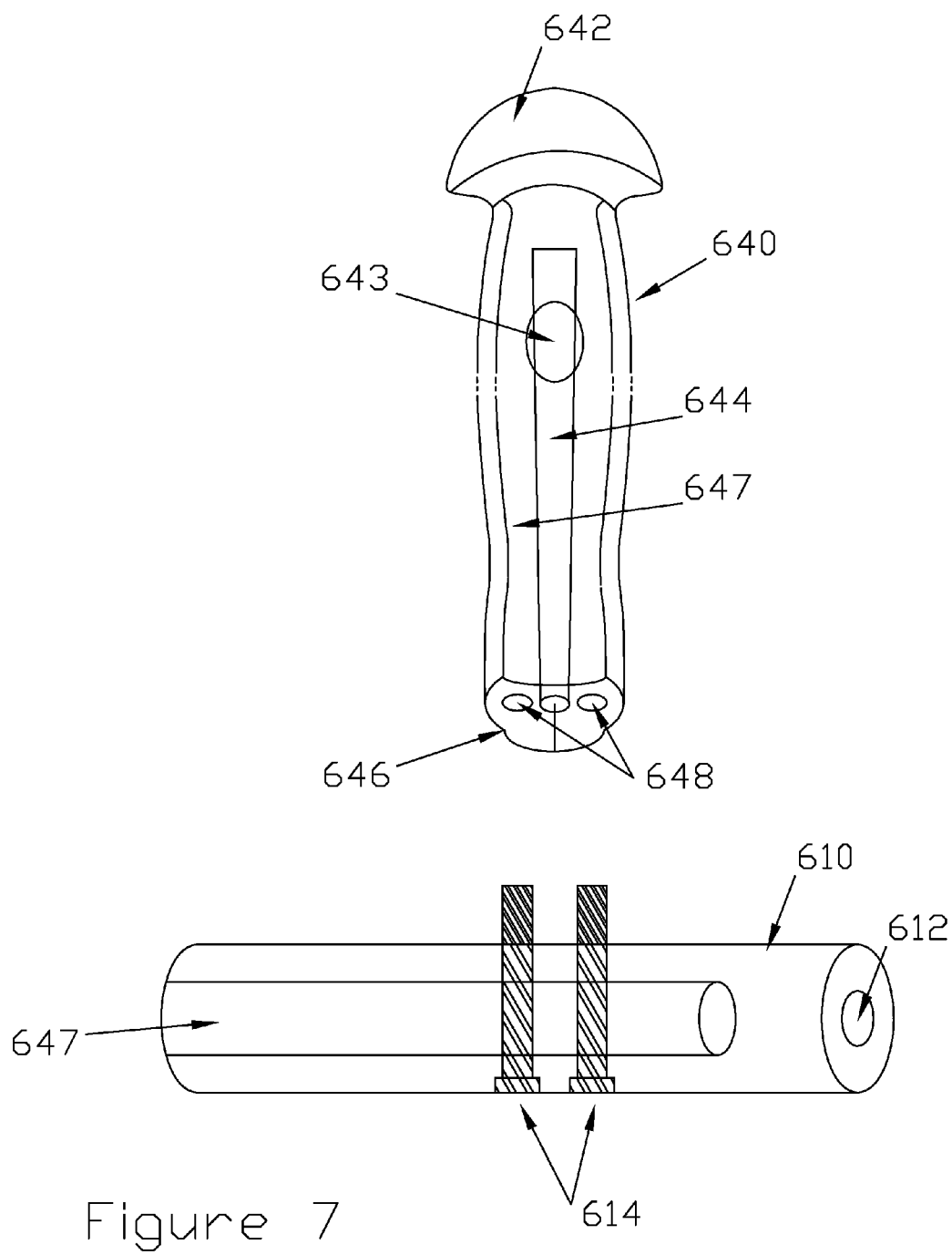
FIG. 7 illustrates an exploded view of a mechanism for connecting a side handle to an elongated member of a police baton, according to an embodiment of the invention which uses screws to make the connection.

FIG. 7 illustrates a mechanism to connect the handle 640 to one of the cylindrical members 610. The handle 640 comprises a cap 642, a roughly cylindrical member 644, and a base 646. The base 646 is configured to be placed on the circular side of cylindrical member 610. The base 646 comprises two apertures 648 configured to accept two screws. The elongated cylindrical member 610, similarly, has two apertures traveling approximately across the diameter of the cylinder. Screws 614 may be placed in these apertures. The screws are longer than the diameter so that they can further extend into apertures 648 to connect the handle to the elongated cylindrical member. The handle may then be detached by removing the screws 614. Optionally, if electronics are implemented in a module on the police baton, a wired or wireless mechanism for transferring data from the handle 640 to the elongated member 610 can also be provided. The connection in FIG. 7 would be completed by allowing screws 614 to enter into apertures 648 completely.

It is noted that many different types of connectors can be used in place of the ones described herein. For example, a bayonet connector can be used. In another embodiment, the connection can be achieved using a strong adhesive configured to connect wood or metal, such as cyanoacrylate adhesive.

FIGS. 10A-10H illustrate different modules that can be used in structure 630 (in FIG. 6). The portion of the elongated member 610 and handle 640 at the second end of the baton housing can be connected with a striking module of FIG. 10A, a striking module with a fold for easy storage of FIG. 10B, a short striking module of FIG. 10C, a traffic wand of FIG. 10D, which, according to one embodiment comprises a light source 1010 so that it can be seen in the dark during the night or in bad weather. Other modules depicted, which can be connected to the baton, include glass breaker module of FIG. 10E, breath alcohol analyzer module of FIG. 10F, which, according to one embodiment, comprises a plurality of breath sensors 1020 and a start button 1040 to initiate the scan, an optical scanner and camera module of FIG. 10G, which comprises a camera 1030 and a start button 1040 to initiate the scan, and a stun gun module of FIG. 10H, comprising an aperture for the electric shock device 1050. It is noted that each of these modules comprises a hole 632 configured to accept pin 626, such that the baton may become a single unit. Also, this allows for the fast and simple replacement of modules by an officer in the field.

Figure 19A:
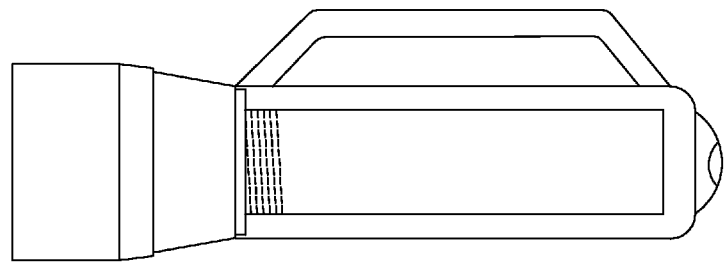
FIGS. 19A-19C show alternate housings for the flashlight module of FIG. 17.
Figure 19B:
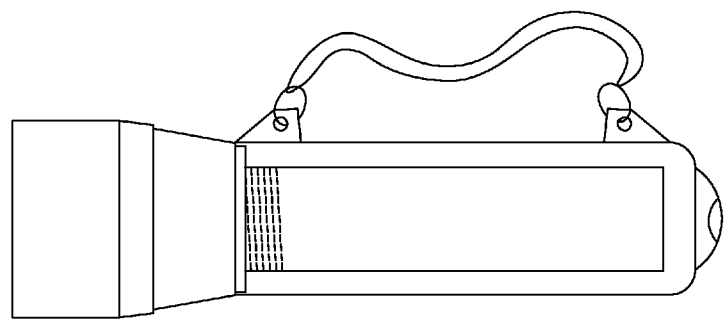
Figure 19C:
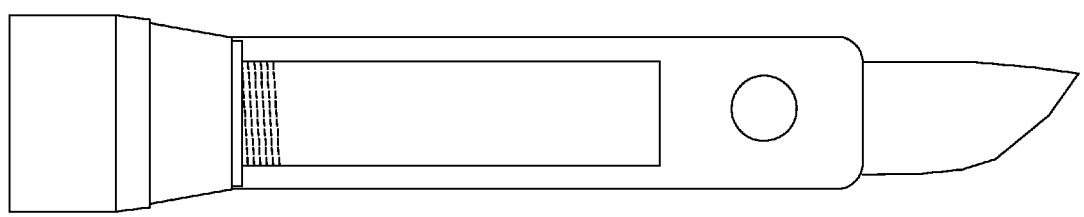

In addition to the elements of the invention so far described, other useful features are possible, including but not limited to the following:

The modular design of the battery housing disposed in the first end of the baton housing enables the battery housing and its module to be disposed in housings to perform other functions, such as flashlight casings shown in FIGS. 19A and 19B or a flashlight casing with a survival knife, as shown in FIG. 19C. One such embodiment provides for the battery housing to be disposed in a casing having contacts for relaying power and control to the flashlight. Some officers in the field like to use a straight baton without a side handle. This plastic casing can be used to achieve that purpose, by having one end of the casing or the battery housing itself accepts a striking module on that end, thereby providing for a straight, lighted baton without a cross handle, while maintaining the other modular features of the basic design.

Figure 23A:
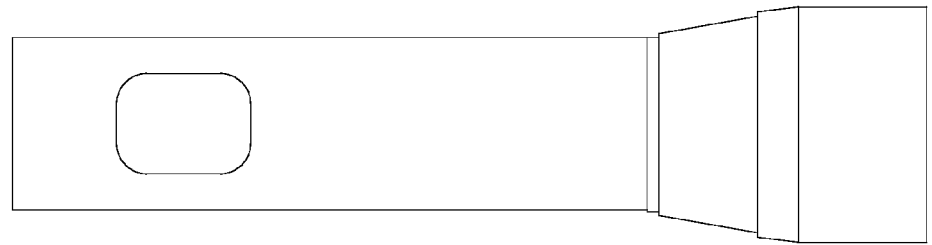
FIG. 23A shows a baton housing with a low-profile module disposed in the side handle connection, said module having a control button for the flashlight module in the first end. This module has a low profile and takes the place of the side handle, thereby enabling a straight baton.
Figure 23B:
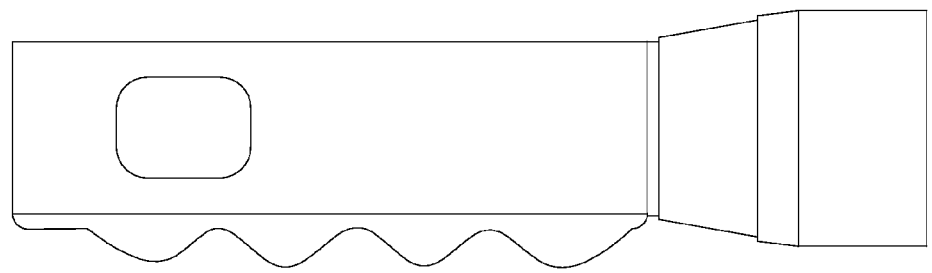
FIG. 23B shows an embodiment in which the low profile module for the side handle which has hand grips, making for a straight baton with hand grips and a single button to control the module disposed in the first end.

Other means of providing the present invention as a straight baton without a side handle (a straight baton) are at least one of connecting cap with a button to the baton hosing in place of the side handle as in FIG. 23A, or a low-profile module with a button that attaches at the side handle position and is shaped to the contour of the baton hosing on one side, and has a plate with hand grip groves on the other side, said portion with hand grip groves going back towards the first end of the baton housing, thereby providing a straight, yet modular baton, having a hand gripping surface as in FIG. 23B. If desired, the gripping surface on this module can be custom made to fit the user's hand.

Figure 20:
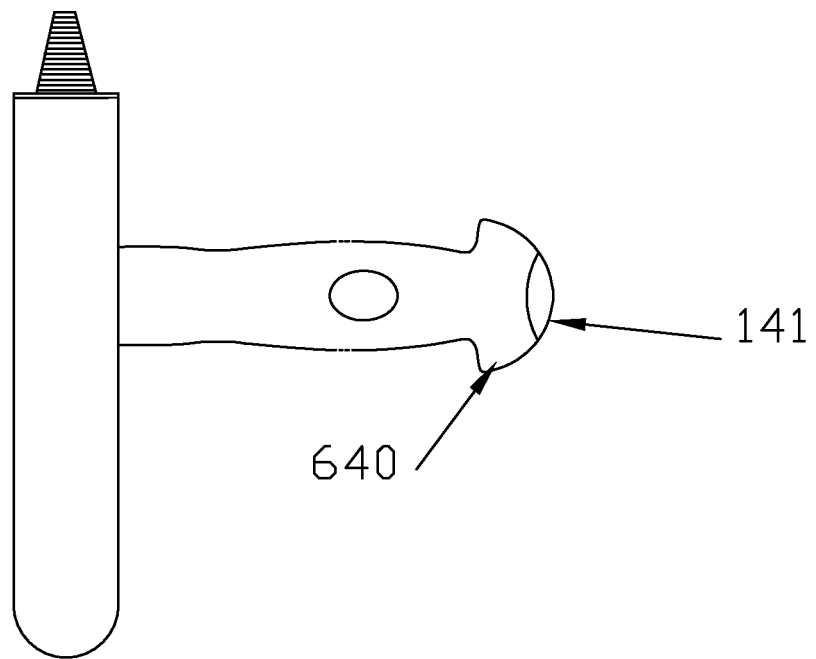
FIGS. 20 and 21 show a side a front view, respectively, of a side handle module having a switch and dazzling illuminator on a bulbous end of the side handle.
Figure 21:
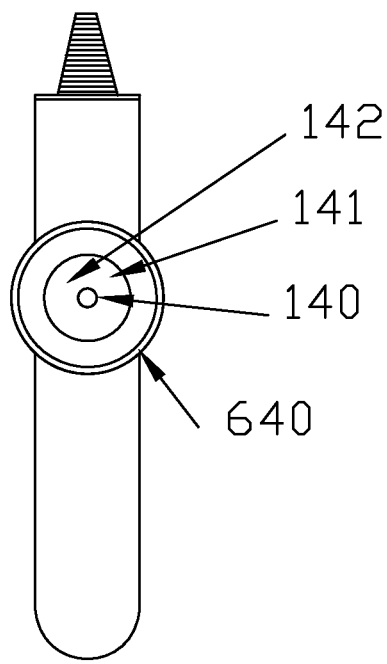

One embodiment provides for a side handle disposed with a utility light in the Trumble Stop (the knob at the distal end of the side handle) as in FIGS. 20 and 21.

A wirelessly enabled embodiment of the baton can be equipped with a GPS, transponder or other locating device, and a wireless control which enables the baton to be located or controlled. For example, a central station may use location information to track an officer carrying the baton or to find a missing officer or lost baton. And if an officer drops or loses his or her baton, it may be desirable for the officer to have a remote control device on his person in order to be able to activate a switch that turns the light or strobe light on in order to help locate the baton, to turn the light off in order to conceal the baton, or to flash the strobe if a potentially hostile subject retrieves the dropped baton.

Many different materials can be used to manufacture the baton. For example, in the preferred embodiment the baton is extruded or molded of a composite material such as Zytel®, Nylon 66, Macro Blend, Glass Filled Polypropylene (30%), carbon fiber composites, fiber glass composites, Hudlar®, Delrin® and other similar materials, or other engineered polymers or composites. Ideally, the material should be light and have a hard surface that is not prone to nicks and scratches from everyday use. In other embodiments the baton may be made of aluminum, steel or wood. It is noted that multiple materials can be used to make the baton and almost any material of sufficient density and strength should suffice, for example the baton housing can be made of a composite material and a striking portion at a second end can be made of aluminum. In a preferred embodiment, there is as little hollow space in the interior of the baton as possible to permit high strength and low vibration, to facilitate transmission of force to a perpetrator without breakage of the baton, and the elements of some embodiments (such as the battery housing and/or dowels) are used to reinforce at least a portion of any empty space in the baton cavity. However, it is recognized that some open space might be necessary, for example to contain electronic logic, a light bulb or a space for storing pepper spray or a taser.

The computer memory may be programmed in a substantially arbitrary programming language configured to write code for simple electronics and data transfers, such as Java or C. Programming techniques for inter-device communication via USB and Bluetooth are well-known and are implemented in data transfers between two different cell phones, between cell phones and laptop and desktop computers, between computers and digital music players, etc.

In this detailed discussion several embodiments were discussed. These embodiments are exemplary, not limiting. The invention is only limited by the following claims.

The invention claimed is:

1. A side handle baton comprising:
a baton housing comprising a elongated member having at least a partial cavity, and at least one connection point for connecting a perpendicular side handle;
a side handle connected to said baton housing at said connection point, comprising at least one electronic control device;
at least one removable useful electronic module disposed in a first end of the baton housing, configured to have a separable functional electronic connection with the at least electronic one control device in the side handle; and
wherein the side handle baton is configured to withstand repeated baton strikes.

2. The baton according to claim 1, wherein the at least one removable useful module comprises at least two electrically powered removable useful modules, configured to be separately controlled by the control device.

3. The baton according to claim 1, further comprising a tempered glass breaking element.

4. The baton according to claim 1, further comprising a programmable processor and a computer memory configured to store computer instructions for execution by the programmable processor.

5. The baton according to claim 1, further comprising an electronic data communication connector externally accessible from the baton housing.

6. The baton according to claim 1, further comprising a wireless radio configured to communicate data over a radio frequency communication link.

7. The baton according to claim 1, further comprising at least one of an accelerometer, a force gauge, a strain gauge, and an imager.

8. The baton according to claim 1, wherein the at least one removable useful module comprises at least one of a flashlight, a flash, a strobe light, a pepper spray dispenser, an optical scanner, a vehicular speed detector, and a blood alcohol content measurement device.

9. The baton according to claim 1, wherein the at least one removable useful module comprises at least one of an IEEE-802.11 compatible radio, an IEEE-802.15 compatible radio, an IEEE-802.15.4 compatible radio, and an ultra wide band (UWB) radio.

10. The baton according to claim 1, further comprising a battery housing configured to hold a rechargeable battery for operating the at least one removable useful module, and further comprising an electrical connector configured to receive an electrical current for charging the rechargeable battery.

11. The baton according to claim 2, wherein the at least one removable useful module comprises a pair of removable useful modules located on respective opposite ends of the baton housing.

12. The baton according to claim 1, further comprising a pivot on the elongated member configured to allow the elongated member to be folded.

13. The baton according to claim 1, wherein at least one removable useful module is detachably connected to the baton housing by a threaded connector, wherein a pair of isolated electrical connections between the at least one removable useful module and the at least one control device are completed by tightening respective male and female portions of the threaded connector.

14. A baton comprising:
a baton housing comprising a cylindrical elongated member having at least one connection point for connecting a perpendicular side handle;
a side handle connected perpendicularly to said baton housing at said connection point;
a manually operable electrical control device disposed within the side handle, configured to electrically control, through a separable electrical connection, a removable electrical module at a first end of the baton housing; and
a male conical thread extending from a second end of the baton housing, configured to withstand strike forces.

15. The baton according to claim 14, wherein the removable module comprises a flashlight, connected to the electrical control device through at least one sliding contact.

16. The baton according to claim 14, further comprising a female conically threaded baton extension configured to engage the male conical thread.

17. The baton according to claim 14, further comprising a tempered glass breaking device, located concentrically within the male conical thread.

18. The baton according to claim 14, wherein the removable module comprises at least one of a flash, a strobe light; a pepper spray dispenser, an optical scanner, a vehicular speed detector, and a blood alcohol content detector.

19. The baton according to claim 14, wherein the side handle comprises a pepper spray dispenser.

20. A side handle baton intended for striking, comprising:
a baton housing comprising a detachable elongated member;
a strike force sensor;
a side handle connected to said baton housing; and
a programmable automated processor, receiving power from a battery within the battery housing, configured to acquire, maintain and retrieve data for evaluation relating to a striking force of the side handle baton received from the strike force sensor.

21. The side handle baton of claim 20, wherein the strike force sensor is configured to detect a dynamic characteristic of the use of the side handle baton, wherein the sensor comprises at least one of an accelerometer, a force gauge, and a strain gauge, further comprising a non-volatile memory which is configured to receive processed sensor data from the programmable processor, and to retrieve processed sensor data for communication through a communication port.

22. The side handle baton according to claim 21, wherein the communication port comprises a wireless digital data communication port, wherein the programmable processor is configured to execute program instructions communicated through the wireless digital data communication port.

* * * * *